United States Patent
Tanaka et al.

(10) Patent No.: US 10,526,446 B2
(45) Date of Patent: Jan. 7, 2020

(54) POLYCARBONATE RESIN COMPOSITION, METHOD FOR PRODUCING SAME, AND MOLDED OBJECT

(71) Applicant: Mitsubishi Chemical Corporation, Chiyoda-ku (JP)

(72) Inventors: Tomohiko Tanaka, Mie (JP); Asami Kakiuchi, Mie (JP); Takao Kuno, Mie (JP); Hisanori Mori, Mie (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 34 days.

(21) Appl. No.: 15/856,721

(22) Filed: Dec. 28, 2017

(65) Prior Publication Data

US 2018/0118883 A1 May 3, 2018

Related U.S. Application Data

(63) Continuation of application No. PCT/JP2016/069357, filed on Jun. 29, 2016.

(30) Foreign Application Priority Data

Jun. 30, 2015 (JP) .................. 2015-131491
Jun. 30, 2015 (JP) .................. 2015-131492

(51) Int. Cl.
| | |
|---|---|
| C08G 64/16 | (2006.01) |
| C08L 69/00 | (2006.01) |
| C08G 64/30 | (2006.01) |
| C08K 3/00 | (2018.01) |
| C08K 5/00 | (2006.01) |
| C08G 64/40 | (2006.01) |
| C08G 64/02 | (2006.01) |
| C08K 3/08 | (2006.01) |

(52) U.S. Cl.
CPC ....... *C08G 64/302* (2013.01); *C08G 64/0208* (2013.01); *C08G 64/16* (2013.01); *C08G 64/40* (2013.01); *C08K 3/00* (2013.01); *C08K 3/08* (2013.01); *C08K 5/00* (2013.01); *C08L 69/00* (2013.01); *C08K 2003/0818* (2013.01)

(58) Field of Classification Search
None
See application file for complete search history.

(56) References Cited

U.S. PATENT DOCUMENTS

| | | | |
|---|---|---|---|
| 7,659,359 B1 * | 2/2010 | Assink | C08G 64/0208 524/502 |
| 2005/0143554 A1 | 6/2005 | Dhara et al. | |
| 2006/0149024 A1 | 7/2006 | Ono et al. | |
| 2010/0160601 A1 * | 6/2010 | Oda | C08G 64/0208 528/406 |
| 2012/0232198 A1 | 9/2012 | Sasaki | |
| 2012/0238679 A1 | 9/2012 | Sasaki | |
| 2012/0245264 A1 | 9/2012 | Sasaki | |
| 2012/0245265 A1 | 9/2012 | Sasaki | |
| 2012/0245266 A1 | 9/2012 | Yokogi et al. | |
| 2013/0331527 A1 | 12/2013 | Yokogi et al. | |
| 2014/0206826 A1 | 7/2014 | Isahaya et al. | |
| 2014/0268333 A1 | 9/2014 | Tanaka et al. | |
| 2014/0285888 A1 | 9/2014 | Tanaka et al. | |
| 2016/0216408 A1 | 7/2016 | Tanaka et al. | |
| 2016/0264726 A1 | 9/2016 | Isahaya et al. | |
| 2017/0174833 A1 | 6/2017 | Isahaya et al. | |

FOREIGN PATENT DOCUMENTS

| | | |
|---|---|---|
| CN | 102597057 A | 7/2012 |
| CN | 102656231 A | 9/2012 |
| CN | 103370373 A | 10/2013 |
| CN | 103930807 A | 7/2014 |
| EP | 2 511 339 A1 | 10/2012 |
| EP | 2 677 003 A1 | 12/2013 |
| JP | 2009-20963 | 1/2009 |

(Continued)

OTHER PUBLICATIONS

Extended Search Report dated Dec. 14, 2018 in European Patent Application No. 16817994.3, 6 pages.
International Search Report dated Sep. 6, 2016 in PCT/JP2016/069357, filed on Jun. 29, 2016 (with English Translation).
Combined Chinese Office Action and Search Report dated May 29, 2019 in Chinese Patent Application No. 201680038136.9 (with English translation of Office Action and English translation of Category of Cited Documents), 10 pages.

*Primary Examiner* — David J Buttner

(74) *Attorney, Agent, or Firm* — Oblon, McClelland, Maier & Neustadt, L.L.P.

(57) ABSTRACT

The present invention aims at providing a polycarbonate resin composition having excellent transparency and possessing high levels of biogenic substance content rate, heat resistance, wet heat resistance and impact resistance in a balanced manner, a production method thereof, and a molded body of the polycarbonate resin composition. The present invention is a polycarbonate resin composition including a polycarbonate resin (A) containing a constitutional unit derived from a compound represented by the following formula (1), and an aromatic polycarbonate resin (B), a production method thereof, and a molded body of the resin composition:

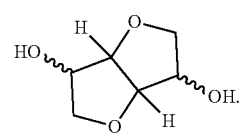

(1)

18 Claims, No Drawings

(56) References Cited

FOREIGN PATENT DOCUMENTS

| | | |
|---|---|---|
| JP | 2009-62501 | 3/2009 |
| JP | 2011-127108 | 6/2011 |
| JP | 2014-205829 | 10/2014 |
| WO | WO 2004/111106 A1 | 12/2004 |
| WO | WO 2005/066239 A1 | 7/2005 |
| WO | WO 2006/041190 A1 | 4/2006 |
| WO | WO 2007/063823 A1 | 6/2007 |
| WO | WO 2011/071162 A1 | 6/2011 |
| WO | WO 2012/111721 A1 | 8/2012 |
| WO | WO 2012/157766 A1 | 11/2012 |
| WO | WO 2013/039178 A1 | 3/2013 |
| WO | WO 2017/000154 A1 | 1/2017 |

* cited by examiner

POLYCARBONATE RESIN COMPOSITION, METHOD FOR PRODUCING SAME, AND MOLDED OBJECT

TECHNICAL FIELD

The present invention relates to a polycarbonate resin composition having excellent transparency and possessing biogenic substance content rate, heat resistance, wet heat resistance and impact resistance in a balanced manner, a production method thereof, and a molded body obtained by molding the resin composition.

BACKGROUND ART

Although a conventional aromatic polycarbonate resin containing a structure originating in bisphenol A, etc. is produced by using a raw material derived from petroleum resources, in recent years, depletion of petroleum resources is concerned, and it is demanded to provide a polycarbonate resin using a raw material obtained from biomass resources such as plant. In addition, because of a concern that global warming due to increase or accumulation of carbon dioxide emissions may bring about climate change, etc., development of a polycarbonate resin using a plant-derived monomer as a raw material and being carbon neutral even when discarded after use is demanded.

Under these circumstances, there has been proposed a method where isosorbide (ISB) which is a dihydroxy compound obtained from biomass resources is used as a monomer component and a polycarbonate resin is obtained through transesterification with a carbonic acid diester with distilling off a by-produced monohydroxy compound under reduced pressure (see, for example, Patent Documents 1 to 7).

However, a dihydroxy compound such as ISB has low thermal stability, in comparison with bisphenol compounds used for a conventional aromatic polycarbonate resin, and there is a problem that the resin is colored through thermal decomposition at the time of polycondensation reaction, molding or processing, which are performed at a high temperature. Furthermore, as for the copolymer of ISB and a bisphenol compound described in Patent Documents 3 to 6, although a polymer having a high glass transition temperature is obtained, on the other hand, the terminal of the polymer becomes a bisphenol compound due to a difference between the reactivity of ISB and the reactivity of a bisphenol compound and when a polymerization temperature lower than the polymerization temperature of an aromatic polycarbonate resin is selected in consideration of color tone or thermal stability of ISB, a kind of end capping occurs, as a result, the polymerization degree may not sufficiently increase, resulting in a polymer having poor impact resistance. This is conspicuous particularly when the copolymerization amount of a bisphenol compound in the polymer is 20 mol % or more.

Furthermore, Patent Document 7 discloses a polycarbonate copolymer containing a constitutional unit derived from ISB, a constitutional unit derived from an aliphatic dihydroxy compound, and a constitutional unit derived from an aromatic bisphenol compound. However, this polycarbonate copolymer also contains a constitutional unit derived from a bisphenol compound and although the heat resistance, moldability and mechanical strength are excellent, the degree of polymerization may not sufficiently increase, resulting in a polymer having poor impact resistance. In addition, the biogenic substance content rate is low, and this is unfavorable in view of environment.

A polycarbonate resin composed of a dihydroxy compound such as isosorbide (ISB) that is a dihydroxy compound obtained from biomass resources, has a high glass transition temperature and excellent heat resistance but is rigid and moreover, has drawbacks of high melt viscosity at the time of melt polymerization and poor impact resistance because polymer having a high molecular weight cannot be obtained. In order to improve toughness, attempts are being made to copolymerize an aliphatic dihydroxy compound or an aromatic bisphenol compound.

Specifically, Patent Document 8 discloses a polycarbonate resin composition containing a polycarbonate resin and an aromatic polycarbonate resin, wherein the polycarbonate resin contains a constitutional unit derived from ISB and a dihydroxy compound of an aliphatic hydrocarbon and the content of a constitutional unit derived from the dihydroxy compound of an aliphatic hydrocarbon is 45 mol % or more. Patent Document 9 discloses a polycarbonate resin composition having excellent pencil hardness, which is obtained by mixing an aromatic polycarbonate resin with a polycarbonate resin containing a constitutional unit derived from ISB and a dihydroxy compound of an aliphatic hydrocarbon.

BACKGROUND ART LITERATURE

Patent Document

Patent Document 1: WO 2004/111106
Patent Document 2: WO 2007/063823
Patent Document 3: WO 2005/066239
Patent Document 4: WO 2006/041190
Patent Document 5: JP-A-2009-062501
Patent Document 6: JP-A-2009-020963
Patent Document 7: JP-A-2011-127108
Patent Document 8: WO 2011/071162
Patent Document 9: WO 2012/111721

SUMMARY OF THE INVENTION

Problems that the Invention is to Solve

However, there is a problem that the copolymer of an aliphatic dihydroxy compound has insufficient heat resistance, and the copolymer of an aromatic bisphenol compound has high heat resistance but is disadvantageous in that a polycarbonate resin having a sufficient large molecular weight is not obtained due to a problem of reactivity. Accordingly, although the resin composition of Patent Document 8 containing an aromatic polycarbonate resin and an ISB-copolymerized polycarbonate resin containing 45 mol % or more of an aliphatic dihydroxy compound is excellent in the transparency, hue, thermal stability, moldability and mechanical strength, when, for example, a composition having a glass transition temperature of 120° C. or more is intended to obtain so as to more increase the heat resistance, the content rate of an aromatic polycarbonate resin in the polycarbonate resin composition must be increased to 50% by weight or more. This means a decrease in the biogenic substance content rate and is unfavorable in view of environment. In the polycarbonate resin of Patent Document 9 obtained by mixing an aromatic polycarbonate resin with a polycarbonate resin containing a constitutional unit derived from ISB and a dihydroxy compound of an aliphatic hydrocarbon, the total light transmittance is substantially less than 20%, giving rise to a problem that the transparency is poor.

The present invention has been made in consideration of such a background and intends to provide a polycarbonate resin composition having excellent transparency and possessing high levels of biogenic substance content rate, heat resistance, wet heat resistance and impact resistance in a balanced manner, a production method thereof, and a molded body of the polycarbonate resin composition.

Means for Solving the Problems

As a result of many intensive studies to solve the problems above, the present inventors have found that a polycarbonate resin composition containing a specific polycarbonate resin (A) and an aromatic polycarbonate resin (B) has excellent transparency and possesses high levels of biogenic substance content rate, heat resistance, wet heat resistance and impact resistance in a balanced manner, and have arrived at the present invention. That is, the gist of the present invention resides in the following [1] to [19].

[1] A polycarbonate resin composition comprising:
a polycarbonate resin (A) containing a constitutional unit derived from a compound represented by the following formula (1),
an aromatic polycarbonate resin (B), and
at least one compound (C) selected from the group consisting of compounds of Group I metals of the long-form periodic table and compounds of Group II metals of the long-form periodic table,
wherein:
the content of the compound (C) per 100 parts by weight of the total amount of the polycarbonate resin (A) and the aromatic polycarbonate resin (B) is from 0.8 to 1,000 ppm by weight in terms of the metal in the compound (C), and
the glass transition temperature as measured by differential scanning calorimetric analysis is single:

[Chem. 1]

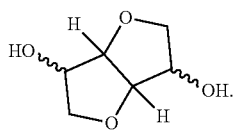

(1)

[2] A polycarbonate resin composition comprising:
a polycarbonate resin (A) containing a constitutional unit derived from a compound represented by the following formula (1),
an aromatic polycarbonate resin (B),
at least one compound (C) selected from the group consisting of compounds of Group I metals of the long-form periodic table and compounds of Group II metals of the long-form periodic table, and
a crown ether compound (D),
wherein:
the content of the compound (C) per 100 parts by weight of the total amount of the polycarbonate resin (A) and the aromatic polycarbonate resin (B) is from 0.8 to 1,000 ppm by weight in terms of the metal in the compound (C), and
the content of the crown ether compound (D) is from 0.1 to 10 times by mol relative to the amount in terms of the metal of the compound (C):

[Chem. 2]

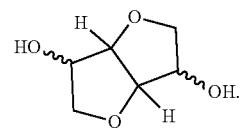

(1)

[3] The polycarbonate resin composition according to the above [2], wherein the glass transition temperature as measured by differential scanning calorimetric analysis is single.

[4] The polycarbonate resin composition according to any one of the above [1] to [3], wherein the total light transmittance of a molded body having a thickness of 2 mm obtained by molding the polycarbonate resin composition is 80% or more.

[5] The polycarbonate resin composition according to any one of the above [1] to [4], wherein the composition contains a Group I metal of the long-form periodic table and a Group II metal of the long-form period table.

[6] The polycarbonate resin composition according to any one of the above [1] to [5], wherein the composition contains, as the compound (C), at least a compound of a Group I metal of the long-form periodic table and the content of the compound of a Group I metal of the long-form period table per 100 parts by weight of the total amount of the polycarbonate resin (A) and the aromatic polycarbonate resin (B) is from 0.8 to 1,000 ppm by weight in terms of the metal.

[7] The polycarbonate resin composition according to any one of the above [1] to [6], wherein the compound (C) is at least one member selected from the group consisting of an inorganic salt (including a carbonate), a carboxylate, a phenolate, a halogen compound and a hydroxylated compound.

[8] The polycarbonate resin composition according to any one of the above [1] to [7], wherein the compound (C) is at least one member selected from the group consisting of a sodium compound, a potassium compound and a cesium compound.

[9] The polycarbonate resin composition according to any one of the above [1] to [8], further comprising an acidic compound (E).

[10] The polycarbonate resin composition according to the above [9], wherein the content of the acidic compound (E) is from 0.1 to 5 times by mol relative to the content of the metal in the compound (C).

[11] A molding body comprising the polycarbonate resin composition according to any one of the above [1] to [10].

[12] A method for producing a polycarbonate resin composition, comprising:
an addition step of adding at least one compound (C) selected from the group consisting of compounds of Group I metals of the long-form periodic table and compounds of Group II metals of the long-form periodic table in an amount of 0.5 to 1,000 ppm by weight in terms of the metal per 100 parts by weight of the total amount of a polycarbonate resin (A) containing a constitutional unit derived from a compound represented by the following formula (1) and an aromatic polycarbonate resin (B), and
a reaction step of melt-reacting the polycarbonate resin (A) with the aromatic polycarbonate resin (B) after the addition step:

[Chem. 3]

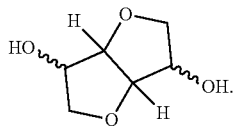

(1)

[13] the Method for Producing a Polycarbonate Resin Composition According to the Above [12], wherein the melt reaction in the reaction step is performed under reduced pressure.

[14] The method for producing a polycarbonate resin composition according to the above [12] or [13], wherein the melt reaction in the reaction step is carried out under the condition of a vacuum degree of 30 kPa or less.

[15] The method for producing a polycarbonate resin composition according to any one of the above [12] to [14], wherein the compound (C) is at least one member selected from the group consisting of an inorganic salt (including a carbonate), a carboxylate, a phenolate, a halogen compound and a hydroxylated compound.

[16] The method for producing a polycarbonate resin composition according to any one of the above [12] to [15], wherein the compound (C) is at least one member selected from the group consisting of a sodium compound, a potassium compound and a cesium compound.

[17] The method for producing a polycarbonate resin composition according to any one of the above [12] to [16], wherein a crown ether compound (D) is further added in the addition step and the amount added of the crown ether compound (D) is from 0.1 to 10 times by mol relative to the amount in terms of the metal of the compound (C).

[18] The method for producing a polycarbonate resin composition according to any one of the above [12] to [17], wherein an acidic compound (E) is further added in the addition step.

[19] The method for producing a polycarbonate resin composition according to the above [18], wherein the amount added of the acidic compound (E) is from 0.1 to 5 times by mol relative to the amount added of the metal in the compound (C).

Effect of the Invention

The polycarbonate resin composition and its molded body of the present invention have excellent transparency and possess high levels of biogenic substance content rate, heat resistance, wet heat resistance and impact resistance in a balanced manner. The polycarbonate resin composition of the present invention is obtained by performing an addition step and a reaction step as described above.

MODE FOR CARRYING OUT THE INVENTION

Although the mode for carrying out the present invention is described in detail below, the following descriptions of constituent elements are an example (representative example) of the embodiment of the present invention and as long as its gist is observed, the present invention is not limited to the contents below.

[Polycarbonate Resin (A)]

The polycarbonate resin (A) contains a constitutional unit derived from a dihydroxy compound represented by the following formula (1) (this unit is appropriately referred to as "constitutional unit (a)"). The polycarbonate resin (A) may be a homopolycarbonate resin of the constitutional unit (a) or may be a polycarbonate resin obtained by copolymerizing a constitutional unit other than the constitutional unit (a). In view of higher impact resistance, a copolymerized polycarbonate resin is preferred.

[Chem. 4]

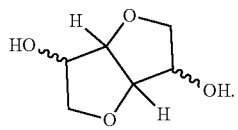

(1)

The dihydroxy compound represented by formula (1) includes isosorbide (ISB), isomannide, and isoidetto, which are in a stereoisomeric relationship. One of these may be used alone, or two or more thereof may be used in combination.

Among the dihydroxy compounds represented by formula (1), isosorbide (ISB) obtained by dehydration condensation of sorbitol produced from various starches existing abundantly as plant-derived resources and being easily available is most preferred in terms of availability, ease of production, weather resistance, optical properties, moldability, heat resistance and carbon neutrality.

The dihydroxy compound represented by formula (1) tends to be gradually oxidized by oxygen. Accordingly, during storage or in handling at the time of production, it is preferable to allow no mingling of water for preventing decomposition due to oxygen or to use a deoxidizer or create a nitrogen atmosphere.

The polycarbonate resin (A) is preferably a copolymerized polycarbonate resin containing a constitutional unit (a) derived from a dihydroxy compound represented by formula (1) and a constitutional unit derived from one or more dihydroxy compounds selected from the group consisting of a dihydroxy compound of an aliphatic hydrocarbon, a dihydroxy compound of an alicyclic hydrocarbon, and an ether-containing dihydroxy compound (this constitutional unit is appropriately referred to as "constitutional unit (b)"). These dihydroxy compounds have a flexible molecular structure and therefore, when such a dihydroxy compound is used as a raw material, the toughness of the obtained polycarbonate resin (A) can be enhanced. Among these dihydroxy compounds, a dihydroxy compound of a aliphatic hydrocarbon and a dihydroxy compound of an alicyclic hydrocarbon, each having a large effect of enhancing the toughness, are preferably used, and use of a dihydroxy compound of an alicyclic hydrocarbon is most preferred. Specific examples of the dihydroxy compound of an aliphatic hydrocarbon, the dihydroxy compound of an alicyclic hydrocarbon, and the ether-containing dihydroxy compound are as follows.

As the dihydroxy compound of an aliphatic hydrocarbon, for example, the following dihydroxy compounds can be employed: a linear aliphatic dihydroxy compound such as ethylene glycol, 1,3-propanediol, 1,2-propanediol, 1,4-butanediol, 1,5-heptanediol, 1,6-hexanediol, 1,9-nonanediol, 1,10-decanediol and 1,12-dodecanediol; and an aliphatic dihydroxy compound having a branched chain, such as 1,3-butanediol, 1,2-butanediol, neopentyl glycol and hexylene glycol.

As the dihydroxy compound of an alicyclic hydrocarbon, for example, the following dihydroxy compounds can be employed: a dihydroxy compound that is a primary alcohol of an alicyclic hydrocarbon, as exemplified by, e.g., a dihydroxy compound derived from a terpene compound, such as 1,2-cyclohexane dimethanol, 1,3-cyclohexane dimethanol, 1,4-cyclohexane dimethanol, tricyclodecane dimethanol, pentacyclopentadecane dimethanol, 2,6-decalin dimethanol, 1,5-decalin dimethanol, 2,3-decalin dimethanol, 2,3-norbomane dimethanol, 2,5-norbornane dimethanol, 1,3-adamantane dimethanol and limonene; and a dihydroxy compound that is a secondary or tertiary alcohol of an alicyclic hydrocarbon, as exemplified by, e.g., 1,2-cyclohexanediol, 1,4-cyclohexanediol, 1,3-adamantanediol, hydrogenated bisphenol A, and 2,2,4,4-tetramethyl-1,3-cyclobutanediol.

The ether-containing dihydroxy compounds includes oxyalkylene glycols and a dihydroxy compound containing an acetal ring.

As the oxyalkylene glycols, for example, diethylene glycol, triethylene glycol, tetraethylene glycol, polyethylene glycol, and polypropylene glycol may be employed.

As the dihydroxy compound containing an acetal ring, for example, a spiroglycol represented by the following structural formula (2), and a dioxane glycol represented by the following structural formula (3) may be employed.

[Chem. 5]

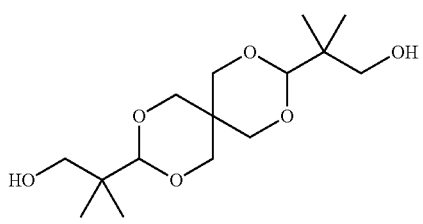

(2)

[Chem. 6]

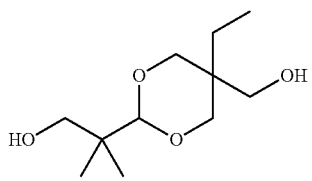

(3)

In the polycarbonate resin (A), the content ratio of the constitutional unit (a) relative to 100 mol % of constitutional units derived from all dihydroxy compounds is not particularly limited but is preferably more than 40 mol %, more preferably more than 50 mol %, still more preferably from 55 to 95 mol %, yet still more preferably from 60 to 90 mol %, and most preferably from 65 to 85 mol %. In such a case, the biogenic substance content rate can be more increased, and the heat resistance can be more enhanced. The content ratio of the constitutional unit (a) in the polycarbonate resin (A) may be 100 mol %, but from the viewpoint of more increasing the molecular weight and from the viewpoint of more enhancing the impact resistance, a constitutional unit other than the constitutional unit (a) is preferably copolymerized in the polycarbonate resin (A).

The polycarbonate resin (A) may further contain a constitutional unit other than the constitutional unit (a) and the constitutional unit (b). As such a constitutional unit (other dihydroxy compounds), for example, a dihydroxy compound containing an aromatic group may be employed.

However, if a large amount of a constitutional unit derived from a dihydroxy compound containing an aromatic group is contained in the polycarbonate resin (A), for the reason above, a polycarbonate resin (A) having a high molecular weight is not obtained, and the effect of enhancing the impact resistance may decrease. Accordingly, from the viewpoint of more enhancing the impact resistance, the content ratio of the constitutional unit derived from a dihydroxy compound containing an aromatic group is preferably 10 mol % or less, more preferably 5 mol % or less, relative to 100 mol % of constitutional units derived from all dihydroxy compounds.

As the dihydroxy compound containing an aromatic group, for example, the following dihydroxy compounds can be employed, but a dihydroxy compound other than these may also be employed: an aromatic bisphenol compound such as 2,2-bis(4-hydroxyphenyl)propane, 2,2-bis(3-methyl-4-hydroxyphenyl)propane, 2,2-bis(4-hydroxy-3,5-dimethylphenyl)propane, 2,2-bis(4-hydroxy-3,5-diethylphenyl)propane, 2,2-bis(4-hydroxy-(3-phenyl)phenyl)propane, 2,2-bis(4-hydroxy-(3,5-diphenyl)phenyl)propane, 2,2-bis(4-hydroxy-3,5-dibromophenyl)propane, bis(4-hydroxyphenyl)methane, 1,1-bis(4-hydroxyphenyl)ethane, 2,2-bis(4-hydroxyphenyl)butane, 2,2-bis(4-hydroxyphenyl)pentane, 1,1-bis(4-hydroxyphenyl)-1-phenylethane, bis(4-hydroxyphenyl)diphenylmethane, 1,1-bis(4-hydroxyphenyl)-2-ethylhexane, 1,1-bis(4-hydroxyphenyl)decane, bis(4-hydroxy-3-nitrophenyl)methane, 3,3-bis(4-hydroxyphenyl)pentane, 1,3-bis(2-(4-hydroxyphenyl)-2-propyl)benzene, 1,3-bis(2-(4-hydroxyphenyl)-2-propyl)benzene, 2,2-bis(4-hydroxyphenyl)hexafluoropropane, 1,1-bis(4-hydroxyphenyl)cyclohexane, bis(4-hydroxyphenyl)sulfone, 2,4'-dihydroxydiphenylsulfone, bis(4-hydroxyphenyl)sulfide, bis(4-hydroxy-3-methylphenyl)sulfide, bis(4-hydroxyphenyl)disulfide, 4,4'-dihydroxydiphenyl ether and 4,4'-dihydroxy-3,3'-dichlorodiphenyl ether; a dihydroxy compound having an ether group bonded to an aromatic group, such as 2,2-bis(4-(2-hydroxyethoxy)phenyl)propane, 2,2-bis(4-(2-hydroxypropoxy)phenyl)propane, 1,3-bis(2-hydroxyethoxy)benzene, 4,4'-bis(2-hydroxyethoxy)biphenyl, bis(4-(2-hydroxyethoxy)phenyl)sulfone; and a dihydroxy compound having a fluorene ring, such as 9,9-bis(4-(2-hydroxyethoxy)phenyl)fluorene, 9,9-bis(4-hydroxyphenyl)fluorene, 9,9-bis(4-hydroxy-3-methylphenyl)fluorene, 9,9-bis(4-(2-hydroxypropoxy)phenyl)fluorene, 9,9-bis(4-(2-hydroxyethoxy)-3-methylphenyl)fluorene, 9,9-bis(4-(2-hydroxypropoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene and 9,9-bis(4-(3-hydroxy-2,2-dimethylpropoxy)phenyl)fluorene.

The other dihydroxy compound may be appropriately selected according to the properties required of the polycarbonate resin (A). Only one of other dihydroxy compounds recited above may be used, or a plurality of kinds thereof may be used in combination. When the other dihydroxy compound is used in combination with the dihydroxy compound represented by formula (1), an effect of, for example, improving the flexibility or mechanical properties of the polycarbonate resin (A) or improving the moldability can be obtained.

The dihydroxy compound used as a raw material of the polycarbonate resin (A) may contain a stabilizer such as reducing agent, antioxidant, deoxidizer, light stabilizer, antacid, pH stabilizer and heat stabilizer. In particular, the dihydroxy compound represented by formula (1) is susceptible to a change in quality under acidic conditions. Accordingly, the change in quality of the dihydroxy compound represented by formula (1) can be suppressed by using a basic stabilizer in the process of synthesizing the polycarbonate resin (A) and in turn, the quality of the obtained polycarbonate resin composition can be more enhanced.

As the basic stabilizer, for example, the following compounds can be employed: hydroxides, carbonates, phosphates, phosphites, hypophosphites, borates and fatty acid salts of Group I or Group II metals in the long-form periodic table (Nomenclature of Inorganic Chemistry IUPAC Recommendations 2005); a basic ammonium compound such as tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenyl ammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenyl ammonium hydroxide and butyltriphenylammonium hydroxide; an amine-based compound such as diethylamine, dibutylamine, triethylamine, morpholine, N-methylmorpholine, pyrrolidine, piperidine, 3-amino-1-propanol, ethylenediamine, N-methyldiethanolamine, diethyl ethanolamine, diethanolamine, triethanolamine, 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole and aminoquinoline; and a hindered amine-based compound such as di-(tert-butyl) amine and 2,2,6,6-tetramethylpiperidine.

Although the content of the basic stabilizer in the dihydroxy compound is not particularly limited, since the dihydroxy compound represented by formula (1) is unstable in the acidic state, the content of the basic stabilizer is preferably set such that the pH of an aqueous solution of the dihydroxy compound containing the basic stabilizer becomes around 7.

The content of the basic stabilizer relative to the dihydroxy compound represented by formula (1) is preferably from 0.0001 to 1% by weight. In this case, the effect of preventing a change in quality of the dihydroxy compound represented by formula (1) is sufficiently obtained. From the viewpoint of more increasing this effect, the content of the basic stabilizer is more preferably from 0.001 to 0.1% by weight.

As the carbonic acid diester used as a raw material of the polycarbonate resin (A), usually, a compound represented by the following formula (4) may be employed. One of these carbonic acid diesters may be used alone, or two or more thereof may be used in combination.

[Chem. 7]

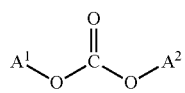

(4)

In formula (4), each of $A^1$ and $A^2$ is a substituted or unsubstituted aliphatic hydrocarbon group having a carbon number of 1 to 18 or a substituted or unsubstituted aromatic hydrocarbon group, and $A^1$ and $A^2$ may be the same or different. As $A^1$ and $A^2$, a substituted or unsubstituted aromatic hydrocarbon group is preferably employed, and it is more preferable to employ an unsubstituted aromatic hydrocarbon group.

As the carbonic acid diester represented by formula (4), for example, a substituted diphenyl carbonate such as diphenyl carbonate (DPC) and ditolyl carbonate, a dimethyl carbonate, a diethyl carbonate, and a di-tert-butyl carbonate may be employed. Among these carbonic acid diesters, a diphenyl carbonate and a substituted diphenyl carbonate are preferably used, and it is more preferable to use a diphenyl carbonate. Incidentally, the carbonic acid diester sometimes contains impurities such as chloride ion, and since the impurities may inhibit the polycondensation reaction or cause deterioration of the color tone of the obtained polycarbonate resin (A), it is preferable to use a carbonic acid diester purified as needed by distillation, etc.

The polycarbonate resin (A) can be synthesized by polycondensation through a transesterification reaction of the above-described dihydroxy compound and carbonic acid diester. More specifically, the polycarbonate resin can be obtained by allowing, in the course of polycondensation, a monohydroxy compound, etc. by-produced during the transesterification reaction to be removed out of the system.

The transesterification reaction proceeds in the presence of a transesterification reaction catalyst (hereinafter, the transesterification catalyst is referred to as "polymerization catalyst"). The kind of the polymerization catalyst may very greatly affect the reaction rate of the transesterification reaction and the quality of the obtained polycarbonate resin (A).

The polymerization catalyst is not limited as long as the transparency, color tone, heat resistance, weather resistance and mechanical strength of the obtained polycarbonate resin (A) can be satisfied. As the polymerization catalyst, for example, a compound of a metal of Group I or Group II (in general, sometimes denoted as Group 1 or Group 2 in the long-form periodic table but hereinafter, is denoted simply as "Group 1" or "Group 2"), and a basic compound such as basic boron compound, basic phosphorus compound, basic ammonium compound and amine-based compound, may be used, and among these, a Group 1 metal compound and/or a Group 2 metal compound are preferred.

As the Group 1 metal compound, for example, the following compounds can be employed: sodium hydroxide, potassium hydroxide, lithium hydroxide, cesium hydroxide, sodium hydrogencarbonate, potassium hydrogencarbonate, lithium hydrogencarbonate, cesium hydrogencarbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium borohydride, potassium borohydride, lithium borohydride, cesium borohydride, sodium borophenylate, potassium borophenylate, lithium borophenylate, cesium borophenylate, sodium benzoate, potassium benzoate, lithium benzoate, cesium benzoate, disodium hydrogenphosphate, dipotassium hydrogenphosphate, dilithium hydrogenphosphate, dicesium hydrogenphosphate, disodium phenylphosphate, dipotassium phenylphosphate, dilithium phenylphosphate, dicesium phenylphosphate, an alcoholate or phenolate of sodium, potassium, lithium and cesium, disodium, dipotassium, dilithium and dicesium salts of bisphenol A, etc.

As the Group 1 metal compound, in view of polymerization activity and color tone of the obtained polycarbonate resin (A), a lithium compound is preferred.

As the Group 2 metal compound, for example, the following compounds can be employed: calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate, etc.

From the viewpoint that the transparency, initial Haze (haze) and impact resistance of a molded body obtained by molding the polycarbonate resin composition can be more enhanced, the polymerization catalyst is more preferably a Group 2 metal compound. From the viewpoint that the transparency, initial Haze (haze) and impact resistance of a molded body obtained by molding the polycarbonate resin composition can be further more enhanced, the Group 2 metal compound is preferably a magnesium compound, a calcium compound, or a barium compound. In view of the polymerization activity and color tone of the obtained polycarbonate resin (A), a magnesium compound and/or a calcium compound are more preferred, and a calcium compound is most preferred.

Incidentally, together with the Group 1 metal compound and/or the Group 2 metal compound, a basic compound such as basic boron compound, basic phosphorus compound, basic ammonium compound and amine-based compound may be secondarily used in combination, and it is particularly preferable to use only a Group 1 metal compound and/or a Group 2 metal compound.

As the basic phosphorus compound, for example, the following compounds can be employed: triethylphosphine, tri-n-propylphosphine, triisopropylphosphine, tri-n-butylphosphine, triphenylphosphine, tributylphosphine, a quaternary phosphonium salt, etc.

As the basic ammonium compound, for example, the following compounds can be employed: tetramethylammonium hydroxide, tetraethylammonium hydroxide, tetrapropylammonium hydroxide, tetrabutylammonium hydroxide, trimethyl ethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, butyltriphenylammonium hydroxide, etc.

As the amine-based compound, for example, the following compounds can be employed: 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, aminoquinoline, guanidine, etc.

The amount of the polymerization catalyst used is preferably from 0.1 to 300 μmol, more preferably from 0.5 to 100 μm, still more preferably from 1 to 50 μmol, per mol of all dihydroxy compounds used for the reaction.

In the case of using, as the polymerization catalyst, a compound containing a Group 2 metal in the long-form periodic table, particularly in the case of using a magnesium compound and/or a calcium compound, the amount of the polymerization catalyst used is preferably 0.1 μmol or more, more preferably 0.3 μmol or more, still more preferably 0.5 μmol or more, per mol of all dihydroxy compounds used for the reaction. The upper limit is preferably 10 μmol or less, more preferably 5 μmol or less, still more preferably 3 μm or less.

Incidentally, unless a special purification operation is performed, the compound used as a catalyst at the time of polymerization remains also in the polycarbonate resin itself, and the amount thereof is the same as the amount used at the time of production.

When the amount of the polymerization catalyst used is adjusted to the range above, the polymerization rate can be increased, so that a polycarbonate resin (A) having a desired molecular weight can be obtained by not necessarily raising the polymerization temperature, as a result, deterioration of the color tone of the polycarbonate resin (A) can be suppressed. In addition, the molar ratio between the dihydroxy compound and the carbonic acid diester can be prevented from being disrupted due to volatilization of an unreacted raw material in the middle of polymerization and therefore, a resin having a desired molecular weight can be more reliably obtained. Furthermore, occurrence of a parallel side reaction can be suppressed, so that deterioration of the color tone of the polycarbonate resin (A) or coloring at the time of molding and processing can be more successfully prevented.

Among the Group 1 metals, considering an adverse effect of sodium, potassium or cesium on the color tone of the polycarbonate resin (A) or an adverse effect of iron on the color tone of the polycarbonate resin (A), the total content of sodium, potassium, cesium and iron in the polycarbonate resin (A) is preferably 1 ppm by weight or less. In this case, deterioration of the color tone of the polycarbonate resin (A) can be more successfully prevented, and the color tone of the polycarbonate resin (A) can be more improved. From the same viewpoint, the total content of sodium, potassium cesium and iron in the polycarbonate resin (A) is more preferably 0.5 ppm by weight or less. Incidentally, such a metal may get mixed in not only from the catalyst used but also from a raw material or a reaction apparatus. Irrespective of the source, the total amount of compounds of these metals in the polycarbonate resin (A) is preferably adjusted to fall in the above-described range in terms of the total content of sodium potassium, cesium and iron.

(Synthesis of Polycarbonate Resin (A))

The polycarbonate resin (A) is obtained by polycondensation through a transesterification reaction of a dihydroxy compound used as a raw material, like e.g. a dihydroxy compound represented by formula (1), with a carbonic acid diester in the presence of a polymerization catalyst.

The dihydroxy compound as a raw material and the carbonic acid diester are preferably mixed uniformly before the transesterification reaction. The mixing temperature is usually 80° C. or more, preferably 90° C. or more, and is usually 250° C. or less, preferably 200° C. or less, more preferably 150° C. or less, and above all, a mixing temperature of 100 to 120° C. is suitable. In this case, the dissolution rate may be increased or the solubility may be sufficiently enhanced, and a trouble such as solidification can be fully avoided. Furthermore, in this case, thermal deterioration of the dihydroxy compound may be fully avoided, as a result, the color tone of the obtained polycarbonate resin (A) can be more improved and at the same time, the weather resistance can also be enhanced.

The operation of mixing the dihydroxy compound as a raw material and the carbonic acid diester is preferably performed in an atmosphere having an oxygen concentration of 10 vol % or less, particularly from 0.0001 to 10 vol %, more particularly from 0.0001 to 5 vol %, still more particularly from 0.0001 to 1 vol %. In this case, the color tone can be more improved and at the same time, the reactivity can be increased.

For obtaining the polycarbonate resin (A), the carbonic acid diester is preferably used in a molar ratio of 0.90 to 1.20 relative to all dihydroxy compounds used for the reaction. In this case, an increase in the amount of the terminal hydroxyl group of the polycarbonate resin (A) can be suppressed, so that the thermal stability of the polymer can be improved. Accordingly, coloring at the time of molding can be more successfully prevented or the rate of the transesterification reaction can be enhanced. In addition, a desired high-molecular-weight form can be more reliably obtained. Furthermore, when the amount of the carbonic acid diester used is adjusted to fall in the range above, a decrease in the transesterification reaction rate can be suppressed, and a polycarbonate resin (A) having a desired molecular weight can be more reliably produced. In this case, the thermal history at the time of reaction can also be prevented from increasing, and the color tone or weather resistance of the polycarbonate resin (A) can therefore be more improved. Also, in this case, the amount of the carbonic acid diester remaining in the polycarbonate resin (A) can be decreased, and staining or odor generation during molding can be avoided or reduced. From the same viewpoint as above, the amount of the carbonic acid diester used is more preferably, in terms of the molar ratio, from 0.95 to 1.10 relative to all dihydroxy compounds.

As the method for polycondensation of the dihydroxy compound and the carbonic acid diester, the reaction is conducted in multiple stages by using a plurality of reactors in the presence of the above-described catalyst. The reaction mode includes a batch mode, a continuous mode, and a method combining a batch mode and a continuous mode, and it is preferable to employ a continuous mode where the polycarbonate resin (A) is obtained with less thermal history and the productivity is excellent.

In view of the control of the polymerization rate or the quality of the obtained polycarbonate resin (A), it is important to appropriately select the jacket temperature, the internal temperature and the pressure in the reaction system according to the reaction stage. Specifically, the polycondensation reaction is preferably performed at relatively low temperature and low vacuum in the initial stage of the reaction to obtain a prepolymer and performed at relatively high temperature and high vacuum in the later stage of the reaction to increase the molecular weight to a predetermined value. In this case, the molar ratio between the dihydroxy compound and the carbonic acid diester is easily adjusted to a desired ratio by suppressing distillation of an unreacted monomer. As a result, the polymerization rate can be prevented from decreasing. In addition, a polymer having desired molecular weight or terminal group can be more reliably obtained.

The polymerization rate in the polycondensation reaction is controlled by the balance between the terminal hydroxy group and the terminal carbonate group. Accordingly, when the balance of the terminal groups fluctuates due to distillation of an unreacted monomer, the polymerization rate can be hardly controlled to be constant, and the molecular weight of the obtained resin may largely fluctuate. Since the molecular weight of the resin correlates with the melt viscosity, the melt viscosity may fluctuate at the time of melt-processing the obtained resin, making it difficult to keep the quality of the molded article constant. Such a problem is likely to occur particularly when the polycondensation reaction is performed in a continuous mode.

Use of a reflux condenser in a polymerization reactor is effective for reducing the amount of an unreacted monomer distilled, and the effect thereof is high particularly in the initial stage of the reaction where the amount of an unreacted monomer is large. The temperature of a refrigerant introduced into the reflux condenser may be appropriately selected according to the monomer used, and the temperature of the refrigerant introduced into the reflux condenser is, at the inlet of the reflux condenser, usually from 45 to 180° C., preferably from 80 to 150° C., more preferably from 100 to 130° C. When the temperature of the refrigerant is adjusted to fall in the range above, the effect thereof is fully obtained by sufficiently increasing the reflux volume and at the same time, distillation efficiency for the monohydroxy compound that should be removed by distillation can be sufficiently enhanced. As a result, reduction in the reaction rate can be prevented, and coloring of the obtained resin can be more successfully prevented. As the refrigerant, warm water, steam, heating medium oil, etc. are used, and steam or heating medium oil is preferred.

In order to more improve the color tone of the obtained polycarbonate resin (A) with appropriately maintaining the polymerization rate and suppressing distillation of a monomer, selection of the kind and amount of the above-described polymerization catalyst is important.

The polycarbonate resin (A) is produced using a polymerization catalyst through a step usually having two or more stages. The polycondensation reaction may be performed using one polycondensation reactor through a step having two or more stages by sequentially changing the conditions, and in view of production efficiency, the reaction is preferably performed in multiple stages by using a plurality of reactors and changing the conditions in respective reactors.

From the viewpoint of efficiently performing the polycondensation reaction, in the initial stage where the content of a monomer in the reaction solution is large, it is important to suppress volatilization of the monomer with maintaining a necessary polymerization rate. In the later stage of the reaction, the matter of importance is to sufficiently distill off a monohydroxy compound being generated as a byproduct and thereby shift the equilibrium to the polycondensation reaction side. Accordingly, reaction conditions suitable for the initial stage of the reaction are usually different from the reaction conditions suitable for the later stage of the reaction. For this reason, a plurality of reactors arranged in series are used, whereby the conditions in respective reactors can be easily changed and the production efficiency can be enhanced.

The number of polymerization reactors used in the production of the polycarbonate resin (A) may be at least 2 as described above, and in view of production efficiency, etc., the number of reactors is preferably 3 or more, more preferably from 3 to 5, still more preferably 4. When two or more polymerization reactors are used, a plurality of reaction stages differing in the conditions may be further performed in each polymerization reactor, or the temperature and pressure may be continuously changed.

The polymerization catalyst may be added to a raw material preparation tank or a raw material storage tank or may be added directly to a polymerization tank. From the viewpoint of the feeding stability and controlling the polycondensation reaction, the polymerization catalyst is preferably fed in the form of an aqueous solution by disposing a catalyst feed line in the middle of a raw material line before it is fed to a polymerization reactor.

When the temperature of the polycondensation reaction is adjusted, this makes it possible to enhance the productivity or avoid an increase in the thermal history of the product. Furthermore, volatilization of a monomer or decomposition or coloring of the polycarbonate resin (A) can be more successfully prevented. Specifically, as the reaction conditions in the first stage reaction, the following conditions can be employed. That is, the internal temperature of the polymerization reactor is set to a range of usually from 150 to 250° C., preferably from 160 to 240° C., and more preferably from 170 to 230° C. The pressure (hereinafter, the pressure indicates an absolute pressure) of the polymerization reactor is set to a range of usually from 1 to 110 kPa, preferably from 5 to 70 kPa, and more preferably from 7 to 30 kPa. The reaction time is set to a range of usually from 0.1 to 10 hours, preferably from 0.5 to 3 hours. The first stage reaction is preferably conducted with removing the generated monohydroxy compound by distillation from the reaction system.

The reaction in the second and subsequent stages is preferably performed by gradually lowering the pressure of the reaction system from the pressure in the first stage and with continuously removing the generated monohydroxy compound out of the reaction system, finally setting the pressure (absolute pressure) of the reaction system to 1 kPa or less. The maximum internal temperature of the polymerization reactor is set to the range of usually from 200 to 260° C., and preferably from 210 to 250° C. The reaction time is set to the range of usually from 0.1 to 10 hours, preferably from 0.3 to 6 hours, and more preferably from 0.5 to 3 hours.

From the viewpoint of more suppressing coloring or thermal degradation of the polycarbonate resin (A) and obtaining a polycarbonate resin (A) having a better color tone, the maximum internal temperature of the polymerization reactor in all reaction stages is preferably set to the range of 210 to 240° C. In order to prevent a drop of the polymerization rate in the latter half of the reaction and minimize the degradation due to thermal history, a horizontal reactor excellent in the plug-flow properties and interface renewal properties is preferably used in the final stage of the polycondensation reaction.

In the continuous polymerization, for controlling the molecular weight of the finally obtained polycarbonate resin (A) at a certain level, the polymerization rate is preferably adjusted as needed. In this case, the method having good operability is to adjust the pressure of the polymerization reactor in the final stage.

In addition, since the polymerization rate changes according to the ratio between the terminal hydroxy group and the terminal carbonate group as described above, the polymerization rate is daringly suppressed by decreasing the proportion of one terminal group, and the pressure of the polymerization reactor in the final stage is maintained at a high vacuum to that extent, whereby the content of low molecular components remaining in the resin, including a monohydroxy compound, can be decreased. However, in this case, if the proportion of one terminal is too small, only with slight fluctuation of the terminal group balance, the reactivity extremely lowers, and the molecular weight of the obtained polycarbonate resin (A) may not reach the desired molecular weight. In order to avoid such a problem, the polycarbonate resin (A) obtained in the polymerization reactor of the final stage preferably contains a terminal hydroxy group and a terminal carbonate group both in an amount of 10 mol/ton or more. On the other hand, if the contents of both terminal groups are too large, the polymerization rate increases, and the molecular weight becomes too high. For this reason, the content of one terminal group is preferably 60 mol/ton or less.

The amount of the terminal group and the pressure of the polymerization reactor in the final stage are thus adjusted to preferable ranges, and the residual amount of a monohydroxy compound in the resin can thereby be decreased at the outlet of the polymerization reactor. The residual amount of a monohydroxy group in the resin at the outlet of the polymerization reactor is preferably 2,000 ppm by weight or less, more preferably 1,500 ppm by weight or less, still more preferably 1,000 ppm by weight or less. By decreasing the content of a monohydroxy compound at the outlet of the polymerization reactor in this way, devolatilization of a monohydroxy compound, etc. can be easily performed in the later step.

Although the residual amount of a monohydroxy compound is preferably smaller, when it is intended to decrease the residual amount to less than 100 ppm by weight, this requires to employ operating conditions such that the amount of one terminal group is extremely reduced and the pressure of a polymerization reactor is thereby maintained at a high vacuum. In this case, as described above, the molecular weight of the finally obtained polycarbonate resin (A) can be hardly kept at a certain level, and for this reason, the residual amount of a monohydroxy compound is usually 100 ppm by weight or more, preferably 150 ppm by weight or more.

From the viewpoint of effectively utilizing resources, the byproduct monohydroxy compound is preferably purified, if desired, and then reused as a raw material of other compounds. For example, in the case where the monohydroxy compound is phenol, the phenol can be used as a raw material of diphenyl carbonate, bisphenol A, etc.

The glass transition temperature of the polycarbonate resin (A) is preferably 90° C. or more. In this case, the heat resistance and the biogenic substance content rate of the polycarbonate resin composition can be enhanced in a balanced manner. From the same viewpoint, the glass transition temperature of the polycarbonate resin (A) is more preferably 100° C. or more, still more preferably 110° C. or more, yet still more preferably 120° C. or more. On the other hand, the glass transition temperature of the polycarbonate resin (A) is preferably 170° C. or less. In this case, the melt viscosity can be reduced by the above-described melt polymerization, and a polymer having an adequate molecular weight can be obtained. In addition, if it is intended to increase the molecular weight by raising the polymerization temperature and in turn, lowering the melt viscosity, since the heat resistance of the constitutional component (a) is not sufficient, the resin may be readily colored. From the viewpoint that the growth of molecular weight and the prevention of coloring can be more enhanced in a balanced manner, the glass transition temperature of the polycarbonate resin (A) is more preferably 165° C. or less, still more preferably 160° C. or less, and yet still more preferably 150° C. or less.

The molecular weight of the polycarbonate resin (A) can be expressed by the reduced viscosity, and a higher reduced viscosity indicates a larger molecular weight. The reduced viscosity is usually 0.30 dL/g or more, and preferably 0.33 dL/g or more. In this case, the mechanical strength of a molded article can be more enhanced. On the other hand, the reduced viscosity is usually 1.20 dL/g or less, preferably 1.00 dL/g or less, and more preferably 0.80 dL/g or less. In this case, the flowability during molding can be enhanced, and the productivity or moldability can be more improved. The reduced viscosity of the polycarbonate resin (A) as used herein is a value when a solution prepared by using methylene chloride as a solvent and precisely adjusting the concentration of the resin composition to 0.6 g/dL is measured by an Ubbelohde viscometer under the condition of a temperature of 20.0° C.±0.1° C. Details of the method for measuring the reduced viscosity and described in Examples.

The melt viscosity of the polycarbonate resin (A) is preferably from 400 to 3,000 Pa·s. In this case, a molded article of the resin composition can be prevented from becoming brittle, and the mechanical properties can be more enhanced. Furthermore, in this case, the flowability at the time of molding and processing can be enhanced, making it possible to prevent degradation of the appearance of a molded article or deterioration of the dimensional accuracy. Moreover, in this case, coloring or bubbling resulting from a rise of the resin temperature due to shear heating can be more successfully prevented. From the same viewpoint, the melt viscosity of the polycarbonate resin (A) is more preferably from 600 to 2,500 Pa·s, and still more preferably from 800 to 2,000 Pa·s. The melt viscosity as used in the present description indicates a melt viscosity at a temperature of 240° C. and a shear rate of 91.2 sec$^{-1}$ as measured by using a capillary rheometer [manufactured by Toyo Seiki Seisaku-Sho, Ltd.). Details of the method for measuring the melt viscosity are described in Examples later.

The polycarbonate resin (A) preferably contains a catalyst deactivator. The catalyst deactivator is not particularly limited as long as it is an acidic substance and has a function of deactivating the polymerization catalyst, and the catalyst deactivator includes, for example, phosphoric acid; trimethyl phosphate; triethyl phosphate; phosphorous acid; a phosphonium salt such as tetrabutylphosphonium octylsulfonate, tetramethylphosphonium benzenesulfonate, tetrabutylphosphonium benzenesulfonate, tetrabutylphosphonium dodecylbenzenesulfonate and tetrabutylphosphonium P-toluenesulfonate; an ammonium salt such as tetramethylammonium decylsulfonate and tetrabutylammonium dodecylbenzenesulfonate; and an alkyl ester such as methyl benzenesulfonate, butyl benzenesulfonate, methyl p-toluenesulfonate, butyl p-toluenesulfonate and ethyl hexadecylsulfonate.

The catalyst deactivator preferably contains a phosphorus-based compound containing a partial structure represented by either the following structural formula (5) or structural formula (6) (hereinafter, referred to as "specific phosphorus-based compound"). The specific phosphorus-based compound can deactivate the later-described polymerization catalyst by its addition after the completion of polycondensation reaction, i.e., for example, in the kneading step or pelletizing step, and prevent the polycondensation reaction from uselessly proceeding after that. As a result, the progress of polycondensation upon heating of the polycarbonate resin (A) in the molding step, etc. can be inhibited and in turn, desorption of the monohydroxy compound can be suppressed. Furthermore, coloring of the polycarbonate resin (A) under high temperature can be more successfully suppressed by deactivating the polymerization catalyst.

[Chem. 8]

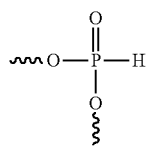

(5)

[Chem. 9]

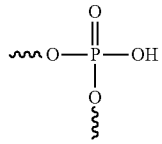

(6)

As the specific phosphorus-based compound containing a partial structure represented by structural formula (5) or (6), a phosphoric acid, a phosphorous acid, a phosphonic acid, a hypophosphorous acid, a polyphosphoric acid, a phosphonic acid ester, an acidic phosphoric acid ester, etc. can be employed. Among specific phosphorus-based compounds, a phosphorous acid, a phosphonic acid, and a phosphonic acid ester are more excellent in the effect of deactivating the catalyst or inhibiting the coloring, and a phosphorous acid is particularly preferred.

As the phosphonic acid, for example, the following compounds can be employed: phosphonic acid (phosphorous acid), methylphosphonic acid, ethylphosphonic acid, vinylphosphonic acid, decylphosphonic acid, phenylphosphonic acid, benzylphosphonic acid, aminomethylphosphonic acid, methylenediphosphonic acid, 1-hydroxyethane-1,1-diphosphonic acid, 4-methoxyphenylphosphonic acid, nitrilotris (methylenephosphonic acid), propylphosphonic anhydride, etc.

As the phosphonic acid ester, for example, the following compounds can be employed: dimethyl phosphonate, diethyl phosphonate, bis(2-ethylhexyl) phosphonate, dilauryl phosphonate, dioleyl phosphonate, diphenyl phosphonate, dibenzyl phosphonate, dimethyl methylphosphonate, diphenyl methylphosphonate, diethyl ethylphosphonate, diethyl benzylphosphonate, dimethyl phenylphosphonate, diethyl phenylphosphonate, dipropyl phenylphosphonate, diethyl (methoxymethyl)phosphonate, diethyl vinylphosphonate, diethyl hydroxymethylphosphonate, dimethyl (2-hydroxyethyl)phosphonate, diethyl p-methylbenzylphosphonate, diethylphosphonoacetic acid, ethyl diethylphosphonoacetate, tert-butyl diethylphosphonoacetate, diethyl (4-chlorobenzyl)phosphonate, diethyl cyanophosphonate, diethyl cyanomethylphosphonate, diethyl 3,5-di-tert-butyl-4-hydroxybenzylphosphonate, diethylphosphonoacetaldehyde diethylacetal, diethyl (methylthiomethyl)phosphonate, etc.

As the acidic phosphoric acid ester, for example, the following compounds can be employed: a phosphoric acid diester such as dimethyl phosphate, diethyl phosphate, divinyl phosphate, dipropyl phosphate, dibutyl phosphate, bis (butoxyethyl) phosphate, bis(2-ethylhexyl) phosphate, diisotridecyl phosphate, dioleyl phosphate, distearyl phosphate, diphenyl phosphate and dibenzyl phosphate, a mixture of phosphoric acid diester/monoester, diethyl chlorophosphate, zinc stearyl phosphate, etc.

One of these specific phosphorus-based compounds may be used alone, or two or more thereof may be mixed and used in arbitrary combination and ratio.

The content of the specific phosphorus-based compound in the polycarbonate resin (A) is preferably from 0.1 to 5 ppm by weight in terms of phosphorus atom. In this case, the effect of the specific phosphorus-based compound of deactivating the catalyst or inhibiting the coloring can be satisfactorily obtained. Furthermore, in this case, coloring of the polycarbonate resin (A) can be more successfully prevented particularly in an endurance test at high temperature and high humidity.

In addition, the effect of deactivating the catalyst or inhibiting the coloring can be more reliably obtained by adjusting the content of the specific phosphorus-based compound according to the amount of the polymerization catalyst. The content of the specific phosphorus-based compound is, in terms of phosphorus atom, preferably from 0.5 to 5 times by mol, more preferably from 0.7 to 4 times by mol, still more preferably from 0.8 to 3 times by mol, per mol of metal atoms in the polymerization catalyst.

Incidentally, the content of the acidic compound (E) in the polycarbonate resin composition can be measured as the amount of elements contained in the acidic compound (E) by means of ICP-MS (inductively coupled plasma mass spectrometer).

[Aromatic Polycarbonate Resin (B)]

The aromatic polycarbonate resin (B) includes, for example, a polycarbonate resin containing, as a main constitutional unit, a constitutional unit derived from an aromatic dihydroxy compound represented by the following formula (7):

[Chem. 10]

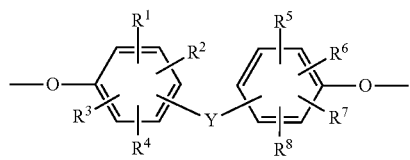

(7)

In formula (7), each of $R^1$ to $R^8$ independently represents a hydrogen atom or a substituent. Y represents a single bond or a divalent group. The substituent of $R^1$ to $R^8$ in formula (7) is an alkyl group having a carbon number of 1 to 10, which may have a substituent, an alkoxy group having a carbon number of 1 to 10, which may have a substituent, a halogen group, an alkyl halide group having a carbon number of 1 to 10, or an aromatic group having a carbon number of 6 to 20, which may have a substituent. Among these, an alkyl group having a carbon number of 1 to 10, which may have a substituent, or an aromatic group having a carbon number of 6 to 20, which may have a substituent, is preferred. The divalent group of Y in formula (7) includes an alkylene group having a chain structure with a carbon number of 1 to 6, which may have a substituent, an alkylidene group having a chain structure with a carbon number of I to 6, which may have a substituent, an alkylene group having a cyclic structure with a carbon number of 3 to 6, which may have a substituent, an alkylidene group having a cyclic structure with a carbon number of 3 to 6, which may have a substituent, —O—, —S—, —CO—, and —SO$_2$—. Here, although the substituent is not particularly limited as long as it does not inhibit the effects of the present invention, the substituent is usually a substituent having a molecular weight of 200 or less. The substituent on an alkylene group having a chain structure with a carbon number of 1 to 6 is preferably an aryl group, more preferably a phenyl group.

Although the aromatic polycarbonate resin (B) may be either a homopolymer or a copolymer, in the case of a copolymer, the resin is preferably a polycarbonate resin where a constitutional unit derived from an aromatic dihydroxy compound represented by formula (7) accounts for a largest proportion among all constitutional units derived from a dihydroxy compound. In the aromatic polycarbonate resin (B), the content ratio of the constitutional unit derived from an aromatic dihydroxy compound represented by formula (7), relative to 100 mol % of all constitutional units derived from all dihydroxy compounds, is preferably 50 mol % or more, more preferably 70 mol % or more, still more preferably 90 mol % or more.

The aromatic polycarbonate resin (B) may have either a branched structure or a linear structure or may have a mixture of a branched structure and a linear structure. Furthermore, the aromatic polycarbonate resin (B) may be a resin containing a constitutional unit derived from a dihydroxy compound having a moiety represented by formula (1). However, in the case of a resin containing a constitutional unit derived from a dihydroxy compound having a moiety represented by formula (1), a polycarbonate resin having a constitutional unit different from that of the polycarbonate resin (A) is used.

The dihydroxy compound-derived constitutional unit constituting the aromatic polycarbonate resin (B) is formed by removing a hydrogen atom from a hydroxyl group of a dihydroxy compound. Specific examples of the corresponding dihydroxy compound include the followings:

a biphenyl compound such as 4,4'-biphenol, 2,4'-biphenol, 3,3'-dimethyl-4,4'-dihydroxy-1,1'-biphenyl, 3,3'-dimethyl-2,4'-dihydroxy-1,1'-biphenyl, 3,3'-di-(tert-butyl)-4,4'-dihydroxy-1,1'-biphenyl, 3,3',5,5'-tetramethyl-4,4'-dihydroxy-1,1'-biphenyl, 3,3',5,5'-tetra-(tert-butyl)-4,4'-dihydroxy-1,1'-biphenyl, and 2,2',3,3',5,5'-hexamethyl-4,4'-dihydroxy-1,1'-biphenyl;

a bisphenol compound such as bis-(4-hydroxy-3,5-dimethylphenyl)methane, bis-(4-hydroxyphenyl)methane, bis-(4-hydroxy-3-methylphenyl)methane, 1,1-bis-(4-hydroxyphenyl)ethane, 1,1-bis-(4-hydroxyphenyl)propane, 2,2-bis-(4-hydroxyphenyl)propane, 2,2-bis-(4-hydroxy-3-methylphenyl)propane, 2,2-bis-(4-hydroxyphenyl)butane, 2,2-bis-(4-hydroxyphenyl)pentane, 2,2-bis-(4-hydroxyphenyl)-3-methylbutane, 2,2-bis-(4-hydroxyphenyl)hexane, 2,2-bis-(4-hydroxyphenyl)-4-methylpentane, 1,1-bis-(4-hydroxyphenyl)cyclopentane, 1,1-bis-(4-hydroxyphenyl)cyclohexane, bis-(3-phenyl-4-hydroxyphenyl)methane, 1,1-bis-(3-phenyl-4-hydroxyphenyl)ethane, 1,1-bis-(3-phenyl-4-hydroxyphenyl)propane, 2,2-bis-(3-phenyl-4-hydroxyphenyl)propane, 1,1-bis-(4-hydroxy-3-methylphenyl)ethane, 2,2-bis-(4-hydroxy-3-ethylphenyl)propane, 2,2-bis-(4-hydroxy-3-isopropylphenyl)propane, 2,2-bis-(4-hydroxy-3-sec-butylphenyl)propane, 1,1-bis-(4-hydroxy-3,5-dimethylphenyl)ethane, 2,2-bis-(4-hydroxy-3,5-dimethylphenyl)propane, 1,1-bis-(4-hydroxy-3, 6-dimethylphenyl)ethane, bis-(4-hydroxy-2,3,5-trimethylphenyl)methane, 1,1-bis-(4-hydroxy-2,3,5-trimethylphenyl)ethane, 2,2-bis-(4-hydroxy-2,3,5-trimethylphenyl)propane, bis-(4-hydroxy-2,3,5-trimethylphenyl)phenylmethane, 1,1-bis-(4-hydroxy-2,3,5-trimethylphenyl)phenylethane, 1,1-bis-(4-hydroxy-3,3,5-trimethylphenyl)cyclohexane, bis-(4-hydroxyphenyl)phenylmethane, 1,1-bis-(4-hydroxyphenyl)-1-phenylethane, 1,1-bis-(4-hydroxyphenyl)-1-phenylpropane, bis-(4-hydroxyphenyl)diphenylmethane, bis-(4-hydroxyphenyl)dibenzylmethane, 4,4'-[1,4-phenylenebis(1-methylethylidene)]bis-[phenol], 4,4'-[1,4-phenylenebismethylene]bis-[phenol], 4,4'-[1,4-phenylenebis(1-methylethylidene)]bis-[2,6-dimethylphenol], 4,4'-[1,4-phenylenebismethylene]bis-[2,6-dimethylphenol], 4,4'-[1,4-phenylenebismethylene]bis-[2,3,6-trimethylphenol], 4,4'-[1,4-phenylenebis(1-methylethylidene)]bis-[2,3,6-trimethylphenol], 4,4'-[1,3-phenylenebis(1-methylethylidene)]bis-[2,3,6-trimethylphenol], 4,4'-dihydroxydiphenyl ether, 4,4'-dihydroxydiphenylsulfone, 4,4'-dihydroxydiphenyl sulfide, 3,3',5,5'-tetramethyl-4,4'-dihydroxydiphenyl ether, 3,3',5,5'-tetramethyl-4,4'-dihydroxydiphenylsulfone, 3,3',5,5'-tetramethyl-4,4'-dihydroxydiphenyl sulfide phenolphthalein, 4,4'-[1,4-phenylenebis(1-methylvinylidene)]bisphenol, 4,4'-[1,4-phenylenebis(1-methylvinylidene)]bis[2-methylphenol], (2-hydroxyphenyl)(4-hydroxyphenyl)methane, (2-hydroxy-5-methylphenyl)(4-hydroxy-3-methylphenyl)methane, 1,1-(2-hydroxyphenyl)(4-hydroxyphenyl)ethane, 2,2-(2-hydroxyphenyl)(4-hydroxyphenyl)propane, and 1,1-(2-hydroxyphenyl)(4-hydroxyphenyl)propane; and a halogenated bisphenol compound such as 2,2-bis(3,5-dibromo-4-hydroxyphenyl)propane and 2,2-bis(3,5-dichloro-4-hydroxyphenyl)propane.

Among these dihydroxy compounds, preferred are bis-(4-hydroxy-3,5-dimethylphenyl)methane, bis-(4-hydroxyphenyl)methane, bis-(4-hydroxy-3-methylphenyl)methane, 1,1-bis-(4-hydroxyphenyl)ethane, 2,2-bis-(4-hydroxyphenyl)propane, 2,2-bis-(4-hydroxy-3-methylphenyl)propane, 2,2-bis-(4-hydroxy-3,5-dimethylphenyl)propane, 1,1-bis-(4-hydroxyphenyl)cyclohexane, 1,1-bis-(4-hydroxy-3,3,5-trimethylphenyl)cyclohexane, bis-(4-hydroxyphenyl)phenylmethane, 1,1-bis(4-hydroxyphenyl)-1-phenylethane, 1,1-bis(4-hydroxyphenyl)-1-phenylpropane, bis(4-hydroxyphenyl)diphenylmethane, 2-hydroxyphenyl(4-hydroxyphenyl)methane, and 2,2-(2-hydroxyphenyl)(4-hydroxyphenyl)propane.

Among these, more preferred are bis-(4-hydroxyphenyl)methane, bis-(4-hydroxy-3-methylphenyl)methane, bis-(4-hydroxy-3,5-dimethylphenyl)methane, 2,2-bis-(4-hydroxyphenyl)propane, 2,2-bis-(4-hydroxy-3-methylphenyl)propane, 2,2-bis-(4-hydroxy-3,5-dimethylphenyl)propane, 1,1-bis-(4-hydroxyphenyl)cyclohexane, and 1,1-bis-(4-hydroxy-3,3,5-trimethylphenyl)cyclohexane.

As for the production method of the aromatic polycarbonate resin (B), any conventionally known method, such as phosgene method, transesterification method or pyridine method, may be used. As an example, a method for producing the aromatic polycarbonate resin (B) by a transesterification process is described below.

The transesterification process is a production method of performing melt transesterification and polycondensation by adding a dihydroxy compound, a carbonic acid diester and a basic catalyst and by further adding an acidic substance for neutralizing the basic catalyst. The dihydroxy compound includes the biphenyl compounds and bisphenol compounds recited above as examples.

Representative examples of the carbonic acid diester include diphenyl carbonate, ditolyl carbonate, bis(chlorophenyl) carbonate, m-cresyl carbonate, dinaphthyl carbonate, bis(biphenyl) carbonate, diethyl carbonate, dimethyl carbonate, dibutyl carbonate, and dicyclohexyl carbonate. Among these, diphenyl carbonate is preferably used.

In view of the balance between mechanical properties and moldability, the viscosity average molecular weight of the aromatic polycarbonate resin (B) is usually from 8,000 to 30,000, preferably from 10,000 to 25,000. As for the reduced viscosity of the aromatic polycarbonate resin (B), a solution prepared by using methylene chloride as a solvent and precisely adjusting the polycarbonate concentration to 0.60 g/dL is measured at a temperature of 20.0±0.1° C. The reduced viscosity is usually from 0.23 to 0.72 dL/g, and preferably from 0.27 to 0.61 dL/g.

In the present invention, only one of these aromatic polycarbonate resins (B) may be used alone, or two or more thereof may be mixed and used.

[Compound (C)]

The compound (C) blended in the polycarbonate resin composition can promote the transesterification reaction of the polycarbonate resin (A) with the aromatic polycarbonate resin (B). The transesterification reaction occurs due to heating at the time of manufacturing the resin composition, for example, when kneading the polycarbonate resin (A) and the aromatic polycarbonate resin (B), and is promoted by the compound (C). As a result, compatibility between the polycarbonate resin (A) and the aromatic polycarbonate resin (B) in the resin composition is enhanced and therefore, the transparency of the resin composition can be increased. In turn, a resin composition having excellent properties such as heat resistance, wet heat resistance and impact resistance can be realized while providing high transparency without decreasing the biogenic substance content rate. The compound (C) may be a compound containing at least one member selected from Group 1 metals and Group 2 metals of the long-form periodic table, and it is preferable to contain a compound of a Group 1 metal of the long-form periodic table, because the haze is low and the wet heat resistance and heat resistance are improved.

In particular, as described later, it is preferred that at least a compound of a Group 1 metal of the long-form periodic table is contained as the compound (C) and the content of the compound of a Group 1 metal of the long-form periodic table per 100 parts by weight of the total amount of the polycarbonate resin (A) and the aromatic polycarbonate resin (B) is from 0.8 to 1,000 ppm by weight, because lower haze and higher wet heat resistance and heat resistance are achieved and good color tone, wet heat resistance and transparency can be more enhanced.

Examples of the metal in the compound (C) include lithium, sodium, potassium, rubidium, cesium, beryllium, magnesium, calcium, strontium, and barium.

Among the Group 1 and Group 2 metals, the metal in the compound (C) is preferably a metal having an electronegativity of 0.7 to 1.1, more preferably a metal having an electronegativity of 0.75 to 1.0, and still more preferably a metal having an electronegativity of 0.75 to 0.98. Specifically, such a metal includes cesium (0.79), potassium (0.82), sodium (0.93), lithium (0.98), barium (0.89), strontium (0.95), and calcium (1.0). The numerical value in the parenthesis is the electronegativity. When the electronegativity is in the range above, it is presumed that the nucleophilicity of a counter ion increases and the transesterification reaction of the polycarbonate resin (A) with the aromatic polycarbonate resin (B) can thereby be more promoted. Accordingly, by employing a metal with an electronegativity in the range above, the transparency of the polycarbonate resin composition can be more enhanced, and the impact resistance can be more increased.

The compound (C) includes an inorganic salt (including a carbonate), a carboxylate, a phenolate, a halogen compound, and a hydroxylated compound, and at least one member selected from these compounds can be used. Specifically, the compound includes a metal salt composed of the metal above and an active hydrogen-containing compound, for example, an organic acid such as carboxylic acid, carbonic acid and phenol, an inorganic acid such as nitric acid, phosphoric acid, boric acid and silicic acid, an alcohol, a thiol, or a primary or secondary amine. The active hydrogen-containing compound may contain a plurality of active hydrogens of the same functional group per molecule or may have two or more functional groups per molecule. It is presumed that such a compound has good dispersibility in the polycarbonate resin (A) or aromatic polycarbonate resin (B) and the transesterification reaction of the polycarbonate resin (A) with the aromatic polycarbonate resin (B) can thereby be more promoted. Among these, a metal salt with an organic acid such as carboxylic acid, carbonic acid or phenol or with an inorganic acid consisting of nitric acid, phosphoric acid, boric acid, etc. is preferred, and a metal salt with an organic acid such as carboxylic acid or carbonic acid or with an inorganic acid consisting of nitric acid, phosphoric acid, boric acid, etc. is more preferred. The metal salt includes halide of the metal and hydroxide of the metal.

The acid dissociation constant (pKa) of the counter ion to the metal ion in the compound (C) is preferably from 2 to 16. In this case, the transparency of the polycarbonate resin composition can be enhanced without increasing the amount of catalyst in terms of metal, and deterioration of the color hue can be more successfully prevented. From the same viewpoint, the acid dissociation constant (pKa) of the counter ion to the metal ion in the compound (C) is more preferably from 3 to 11, and still more preferably from 5 to 10.

As the Group 1 metal compound used as the compound (C), for example, the following compounds can be employed: sodium hydroxide, potassium hydroxide, lithium hydroxide, cesium hydroxide, sodium hydrogencarbonate, potassium hydrogencarbonate, lithium hydrogencarbonate, cesium hydrogencarbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium borohydride, potassium borohydride, lithium borohydride, cesium borohydride, sodium borophenylate, potassium borophenylate, lithium borophenylate, cesium borophenylate, sodium benzoate, potassium benzoate, lithium benzoate, cesium benzoate, disodium hydrogenphosphate, dipotassium hydrogenphosphate, dilithium hydrogenphosphate, dicesium hydrogenphosphate, disodium phenylphosphate, dipotassium phenylphosphate, dilithium phenylphosphate, dicesium phenylphosphate, an alcoholate or phenolate of sodium, potassium, lithium and cesium, disodium, dipotassium, dilithium and dicesium salts of bisphenol A, etc. Among these, from the viewpoint of more enhancing the color hue, impact resistance and reactivity, at least one member selected from the group consisting of a lithium compound, a sodium compound, a potassium compound and a cesium compound is preferred. It is presumed that such a compound has an electronegativity in a proper range and can more promote the transesterification reaction of the polycarbonate resin (A) with the aromatic polycarbonate resin (B). Furthermore, from the viewpoint of more enhancing the transparency, color tone and wet heat resistance, at least one member selected from the group consisting of a sodium compound, a potassium compound and a cesium compound is preferred; a potassium compound and/or a cesium compound is more preferred; and potassium hydrogencarbonate, cesium hydrogencarbonate, potassium carbonate, cesium carbonate, potassium acetate, cesium acetate, potassium stearate, and cesium stearate are still more preferred.

As the Group 2 metal compound used as the compound (C), for example, the following compounds can be employed: calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate, etc. Among these, from the viewpoint of more enhancing the transparency and color tone, a calcium compound is preferred, and calcium hydroxide, calcium hydrogencarbonate and calcium acetate are more preferred.

The amount of metal derived from the compound (C) contained in the polycarbonate resin composition is from 0.8 to 1,000 ppm by weight per 100 parts by weight of the total amount of the polycarbonate resin (A) and the aromatic polycarbonate resin (B). Although it may vary depending on the metal species, if the metal amount exceeds 1,000 ppm by weight, the color tone of the resin composition deteriorates and the wet heat resistance lowers. If the metal amount is less than 0.8 ppm by weight, the transparency of the resin composition is insufficient. From the viewpoint of more enhancing the color tone, wet heat resistance and transparency, the amount of metal derived from the compound (C) is more preferably from 0.9 to 100 ppm by weight, and still more preferably from 1 to 10 ppm by weight. Incidentally, in general, the compound (C) introduced into the polycarbonate resin composition is often deactivated, for example, after the polymerization step by an acidic compound such as butyl p-toluenesulfonate, rather than by the polymerization catalyst for the polycarbonate resin (A) as a raw material or the polymerization catalyst for the aromatic polycarbonate resin (B), and it is therefore preferable to add the compound (C) separately as described later. The compound (C) contained in the polycarbonate resin composition is a concept encompassing both a polymerization catalyst corresponding to the compound (C) used at the time of production of the polycarbonate resin (A) and the aromatic polycarbonate resin (B) and introduced into the resin composition from each of the resin (A) and the resin (B), and a compound (C) added separately at the time of manufacture of the resin composition.

Accordingly, the resin composition of the present invention preferably contains a compound of a Group I metal of the long-form periodic table and a compound of a Group 2 metal of the long-form periodic table, because low haze and good wet heat resistance and heat resistance are achieved and color tone, wet heat resistance and transparency can be more enhanced.

Here, the content of the compound (C) in the polycarbonate resin composition can be measured as a metal amount by using ICP-MS (inductively coupled plasma mass spectrometer).

The amount of the compound (C) added at the time of production of the resin composition may vary depending on the metal species and is, in terms of metal, from 0.5 to 1,000 ppm by weight, preferably from 1 to 100 ppm by weight, more preferably from 1 to 10 ppm by weight, per 100 parts by weight of the total amount of the polycarbonate resin (A) and the aromatic polycarbonate resin (B). If the amount added is less than 0.5 ppm by weight, the transparency of the resin composition is insufficient. On the other hand, if the amount added exceeds 1,000 ppm by weight, the resin composition may be transparent but is intensely colored and in addition, the molecular weight (melt viscosity) thereof is reduced, failing in obtaining a resin composition with excellent impact resistance.

As for the method of adding the compound (C), a compound that is solid may be supplied as a solid, or a compound capable of dissolving in water or a solvent may be added in the form of an aqueous solution or a solution. The compound may be added to the polycarbonate resin raw material or in the case of an aqueous solution or a solution, may be charged from a raw material charging port of an extrude or liquid-added from a cylinder by means of a pump, etc.

[Crown Ether Compound (D)]

As the crown ether compound (D) (hereinafter, sometimes appropriately referred to as "compound (D)") for use in the present invention, an arbitrary compound may be selected, according to the purpose, from various compounds generally known as a crown ether. Crown ethers having a simplest structure are represented by the formula (—$CH_2$—$CH_2$—O—)$_n$. Out of these crown ethers, crown ethers of the formula where n is 4 to 7 are preferred in the present invention. The crown ether is sometimes referred to as an "x-crown-y-ether" in which x is the total number of atoms constituting the ring and y is the number of oxygen atoms contained therein. In the present invention, at least one member selected from the group consisting of crown ethers of x=12, 15, 18 and 21 and y=x/3, benzo-condensed products thereof, and cyclohexyl-condensed products thereof is preferably used. More preferred specific examples of the crown ether include 21-crown-7-ether, 18-crown-6-ether, 15-crown-5-ether, 12-crown-4-ether, dibenzo-21-crown-7-ether, dibenzo-18-crown-6-ether, dibenzo-15-crown-5-ether, dibenzo-12-crown-4-ether, dicyclohexyl-21-crown-7-ether, dicyclohexyl-18-crown-6-ether, dicyclohexyl-15-crown-5-ether, and dicyclohexyl-12-crown-4-ether. Among these, it is most preferable to select the compound from 18-crown-6-ether and 15-crown-5-ether.

The content of the compound (D) is from 0.1 to 10 times by mol relative to the amount, in terms of metal, of the compound (C). If the content is less than 0.1 times by mol, the effect of reducing the amount added of the compound (C) due to addition of the compound (D) is insufficient. As a result, the transparency of the resin composition may be impaired. On the other hand, if the content exceeds 10 times by mol, the resin composition may be intensely colored, though the transparency can be enhanced. Furthermore, the molecular weight (melt viscosity) of the resin composition is reduced, and the impact resistance may be insufficient. From the viewpoint of more enhancing the transparency and impact resistance and more suppressing the coloring, the content of the compound (D) is preferably from 0.5 to 5 times by mol, more preferably from 0.7 to 4 times by mol, still more preferably from 1 to 3 times by mol, relative to the amount, in terms of metal, of the compound (C).

As for the method of adding the compound (D), a compound that is solid may be supplied as a solid, or a compound capable of dissolving in water or a solvent may be added in the form of an aqueous solution or a solution. The compound may be added to the polycarbonate resin raw material or in the case of an aqueous solution or a solution, may be charged from a raw material charging port of an extrude or liquid-added from a cylinder by means of a pump, etc.

Incidentally, the crown ether compound can be detected, for example, as follows.

That is, the crown ether compound can be detected by gas chromatograph-mass spectrometry after dissolving the polymer in a solvent such as methylene chloride, precipitating the polymer by using acetone, etc., and collecting the acetone.

[Acidic Compound (E)]

The polycarbonate resin composition preferably further contains an acidic compound (E). The acidic compound (E) is added at the time of blending of the polycarbonate resin (A) and the aromatic polycarbonate resin (B) and is a concept not encompassing the above-described catalyst deactivator used when producing the polycarbonate resin (A) and the aromatic polycarbonate resin (B). Because, the catalyst deactivator has deprived of the effect itself in the stage of production of the polycarbonate resin (A) and the aromatic polycarbonate resin (B). Here, as the acidic compound (E), the same substances as those for the above-described catalyst deactivator can be used.

The content of the acidic compound (E) is preferably from 0.1 to 5 times by mol per mol of the content of metal in the compound (C) contained in the polycarbonate resin composition. In this case, the wet heat resistance can be more enhanced and at the same time, the thermal stability, for example, during molding can be more increased. From the same viewpoint, the content of the acidic compound (E) is preferably from 0.5 to 2 times by mol, more preferably from 0.6 to 1.5 times by mol, and most preferably from 0.7 to 1 times by mol, per mol of the content of metal in the compound (C).

Here, the content of the acidic compound (E) in the polycarbonate resin composition can be measured as the amount of elements contained in the acidic compound (E) by using ICP-MS (inductively coupled plasma mass spectrometer).

[Polycarbonate Resin Composition]

In the polycarbonate resin composition of the present invention, the total light transmittance in the thickness direction of a molded body having a thickness of 2 mm obtained by molding the resin composition is preferably 80% or more. From the viewpoint that the applicability to transparent usage and the image clarity at the time of spin-dyeing are improved, the total light transmittance is more preferably 85% or more, still more preferably 88% or more, and yet still more preferably 90% or more. The haze of a molded body having a thickness of 2 mm is preferably 1% or less, more preferably 0.5% or less, still more preferably 0.3% or less. The method for measuring the total light transmittance is described later in Examples. The haze can also be measured by the same method as that for the total light transmittance.

In the polycarbonate resin composition, the peak of the glass transition temperature as measured by the DSC method (differential scanning calorimetry) is preferably single.

In the present invention, the glass transition temperature of the polycarbonate resin composition is single, and this specifically means that when the glass transition temperature of the polycarbonate resin composition is measured using a differential scanning calorimeter (DSC) by the following method, only one inflection point indicating the glass transition temperature appears. Due to the single glass transition temperature of the polycarbonate resin composition, the obtained molded body can realize excellent transparency.

(Measurement of Glass Transition Temperature)

Tg of the polycarbonate resin composition is defined as a value of Tmg determined in conformity with the method of JIS-K7121 (1987) from a DSC curve obtained by using a differential scanning calorimeter, "DSC7", manufactured by Perkin Elmer, Inc. and subjecting the resin composition, in a nitrogen gas atmosphere, to temperature rise to 200° C. from 25° C. at a heating rate of 20° C./min; holding at 200° C. for 3 minutes; temperature drop to 25° C. at a cooling rate of 20° C./min; holding at 25° C. for 3 minutes; and again temperature rise to 200° C. at a heating rate of 5° C./min. As for the evaluation of singularity in the glass transition temperature, specifically, when the peak of the DSC curve is single (i.e., only one inflection point indicating the glass transition temperature appears), the glass transition temperature is judged as being single, and when the DSC curve has a plurality of peaks (i.e., a plurality of inflections points indicating the glass transition temperature appear), the glass transition temperature is judged as not being single.

In general, a single glass transition temperature of a polymer blend composition means that the resins mixed are in the state of being compatibilized in nanometer order (molecular level), and this can be recognized as a compatibilized system.

The glass transition temperature of the polycarbonate resin composition is preferably from 100 to 200° C. In this case, the heat resistance can be more enhanced and in turn, deformation of a molded article can be more successfully prevented. In addition, in this case, thermal degradation of the polycarbonate resin (A) at the time of production of the resin composition can be still more successfully prevented, and the impact resistance can be more enhanced. Furthermore, thermal degradation of the resin composition during molding can be more suppressed. From the same viewpoint, the glass transition temperature of the polycarbonate resin composition is more preferably from 110 to 190° C., and still more preferably from 120 to 180° C.

A polycarbonate resin composition exhibiting the above-described predetermined total light transmittance and glass transition temperature can be realized by including a polycarbonate resin (A) containing a constitutional unit derived from a compound represented by formula (1), an aromatic polycarbonate resin (B), and the above-described specific compound (C), and adjusting the content of the compound (C) to fall in the predetermined range above.

Alternatively, a polycarbonate resin composition exhibiting the above-described predetermined total light transmittance and glass transition temperature can be realized by including a polycarbonate resin (A) containing a constitutional unit derived from a compound represented by formula (1), an aromatic polycarbonate resin (B), the above-described specific compound (C), and the above-described specific compound (D), and adjusting the content of the compound (C) and the content of the compound (D) to fall in the predetermined ranges above.

The blending ratio of the polycarbonate resin (A) and the aromatic polycarbonate resin (B) in the polycarbonate resin composition can be arbitrarily selected according to the desired physical properties. From the viewpoint of more increasing the biogenic substance content rate, the weight ratio (A/B) of the polycarbonate resin (A) and the aromatic polycarbonate resin (B) is preferably from 95/5 to 50/50, and more preferably from 90/10 to 60/40. With a weight ratio in this range, the heat resistance, impact resistance and biogenic substance content rate can be increased in a better balanced manner.

Assuming that the sum of the melt viscosity of the polycarbonate resin (A) and the melt viscosity of the aromatic polycarbonate resin (B) each multiplied by the weight ratio is the ideal melt viscosity, the melt viscosity of the polycarbonate resin composition is preferably 40% or more relative to the ideal melt viscosity. In this case, the impact strength can be more enhanced. From the same viewpoint, the melt viscosity of the polycarbonate resin composition is more preferably 60% or more, still more preferably 80% or more, relative to the ideal melt viscosity. Here, the melt viscosity indicates a melt viscosity at a temperature of 240° C. and a shear rate of 91.2 $sec^{-1}$ as measured by using a capillary rheometer [manufactured by Toyo Seiki Seisaku-Sho, Ltd.). Details of the method for measuring the melt viscosity are described in Examples later.

[Other Additives]

In the polycarbonate resin composition, various additives can be added. The additive includes a dye/pigment, an antioxidant, a UV absorber, a light stabilizer, a release agent, a heat stabilizer, a flame retardant, a flame retardant aid, an inorganic filler, an impact improver, a hydrolysis inhibitor, a foaming agent, a nucleating agent, etc., and an additive that is usually used for a polycarbonate resin can be used.

[Dye/Pigment]

The dye/pigment includes an inorganic pigment and an organic dye/pigment such as organic pigment and organic dye.

The inorganic pigment specifically includes, for example, carbon black; and an oxide-based pigment such as titanium oxide, zinc oxide, red oxide, chromium oxide, iron black, titanium yellow, zinc-iron brown, copper-chromium black and copper-iron black.

The organic dye/pigment such as organic pigment and organic dye specifically includes, for example, a phthalocyanine-based dye/pigment; a condensed polycyclic dye/pigment such as azo type, thioindigo type, perinone type, perylene type, quinacridone type, dioxazine type, isoindolinone type and quinophthalone type; and anthraquinone-based, perinone-based, perylene-based, methine-based, quinoline-based, heterocyclic and methyl-based dyes/pigments.

One of these dyes/pigments may be used alone, or two or more thereof may be mixed and used.

Among these inorganic pigments and organic dyes/pigments such as organic pigment and organic dye, an inorganic pigment is preferred. By using an inorganic pigment as a coloring agent, even when a molded article is used outdoors, etc., for example, the image clarity is little degraded and can be held for a long period of time.

The amount of the dye/pigment is preferably from 0.05 to 5 parts by weight, more preferably from 0.05 to 3 parts by weight, and still more preferably from 0.1 to 2 parts by weight, per 100 parts by weight of the total of the polycarbonate resin (A) and the aromatic polycarbonate resin (B). If the amount of the coloring agent is less than 0.05 parts by weight, a spun-dyed molded article with high image clarity can be hardly obtained. If the amount exceeds 5 parts by weight, the surface roughness of a molded article is increased, and a spun-dyed molded article with high image clarity can be hardly obtained.

[Antioxidant]

As the antioxidant, a general antioxidant used for a resin can be used, and in view of oxidation stability and thermal stability, a phosphite-based antioxidant, a sulfur-based antioxidant, and a phenolic antioxidant are preferred. The amount of the antioxidant added is preferably 5 parts by weight or less per 100 parts by weight of the total of the polycarbonate resin (A) and the aromatic polycarbonate resin (B). In this case, contamination of the mold during molding can be more reliably prevented, and a molded article with more excellent surface appearance can be obtained. From the same viewpoint, the amount of the antioxidant added is more preferably 3 parts by weight or less, still more preferably 2 parts by weight or less, per 100 parts by weight of the total of the polycarbonate resin (A) and the aromatic polycarbonate resin (B). In addition, the amount of the antioxidant added is preferably 0.001 parts by weight or more per 100 parts by weight of the total of the polycarbonate resin (A) and the aromatic polycarbonate resin (B). In this case, the effect of improving the molding stability can be sufficiently obtained. From the same viewpoint, the amount of the antioxidant added is more preferably 0.002 parts by weight or more, still more preferably 0.005 parts by weight or more, per 100 parts by weight of the total of the polycarbonate resin (A) and the aromatic polycarbonate resin (B).

(Phosphite-Based Antioxidant)

The phosphite-based antioxidant includes triphenyl phosphite, tris(nonylphenyl)phosphite, tris(2,4-di-tert-butylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, distearylpentaerythritol diphosphite, etc.

Among these, trisnonylphenyl phosphite, tris(2,4-di-tert-butylphenyl)phosphite, bis(2,4-di-tert-butylphenyl)pentaerythritol diphosphite, and bis(2,6-di-tert-butyl-4-methylphenyl)pentaerythritol diphosphite are preferably used. One of these compounds may be used, or two or more thereof may be used in combination.

(Sulfur-Based Antioxidant)

The sulfur-based antioxidant includes, for example, dilauryl-3,3'-thiodipropionic acid ester, ditridecyl-3,3'-thiodipropionic acid ester, dimyristyl-3,3'-thiodipropionic acid ester, distearyl-3,3'-thiodipropionic acid ester, laurylstearyl-3,3'-thiodipropionic acid ester, pentaerythritol tetrakis(3-laurylthiopropionate), bis[2-methyl-4-(3-laurylthiopropionyloxy)-5-tert-butylphenyl] sulfide, octadecyl disulfide, mercaptobenzimidazole, 2-mercapto-6-methylbenzimidazole, and 1,1'-thiobis(2-naphthol). Among these, pentaerythritol tetrakis(3-laurylthiopropionate) is preferred. One of these compounds may be used, or two or more thereof may be used in combination.

(Phenolic Antioxidant)

The phenolic antioxidant includes, for example, compounds such as pentaerythritol tetrakis(3-mercaptopropionate), pentaerythritol tetrakis(3-laurylthiopropionate), glycerol-3-stearylthiopropionate, triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamamide), diethyl 3,5-di-tert-butyl-4-hydroxybenzylphosphonate, tris(3,5-di-tert-butyl-4-hydroxybenzyl) isocyanurate, tetrakis(2,4-di-tert-butylphenyl) 4,4'-biphenylenediphosphinate, 3,9-bis{1,1-dimethyl-2-[3-(3-tert-butyl-4-hydroxy-5-methylphenyl)propionyloxy]ethyl}-2,4,8,10-tetraoxaspiro(5,5)undecane, 2,6-di-tert-butyl-p-cresol and 2,6-di-tert-butyl-4-ethylphenol.

Among these compounds, an aromatic monohydroxy compound substituted with one or more alkyl groups having a carbon number of 5 or more is preferred. Specifically, octadecyl-3-(3,5-di-tert-butyl-4-hydroxyphenyl)propionate, pentaerythrityl-tetrakis{3-(3,5-di-tert-butyl-4-hydroxyphenyl)propionate), 1,6-hexanediol-bis[3-(3,5-di-tert-butyl-4-hydroxyphenyl)propionate], 1,3,5-trimethyl-2,4,6-tris(3,5-di-tert-butyl-4-hydroxybenzyl)benzene, etc. are preferred, and pentaerythrityl-tetrakis(3-(3,5-di-tert-butyl-4-hydroxyphenyl)propionate} is more preferred. One of these compounds may be used, or two or more thereof may be used in combination.

[UV Absorber]

The ultraviolet absorber includes a benzotriazole-based compound, a benzophenone-based compound, a triazine-based compound, a benzoate-based compound, a hindered amine-based compound, a phenyl salicylate-based compound, a cyanoacrylate-based compound, a malonic acid ester-based compound, an oxalanilide-based compound, etc. One of these may be used alone, or two or more thereof may be used in combination.

More specific examples of the benzotriazole-based compound include 2-(2'-hydroxy-3'-methyl-5'-hexylphenyl)benzotriazole, 2-(2'-hydroxy-3'-tert-butyl-5'-hexylphenyl)benzotriazole, 2-(2'-hydroxy-3',5'-di-tert-butylphenyl)benzotriazole, 2-(2'-hydroxy-3'-methyl-5'-tert-octylphenyl)benzotriazole, 2-(2'-hydroxy-5'-tert-dodecylphenyl)benzotriazole, 2-(2'-hydroxy-3'-methyl-5'-tert-dodecylphenyl)benzotriazole, 2-(2'-hydroxy-5'-tert-butylphenyl)benzotriazole, and methyl-3-[3-(2H-benzotriazole-2-yl)-5-tert-butyl-4-hydroxyphenyl] propionate.

The triazine-based compound includes 2-{4-[(2-hydroxy-3-dodecyloxypropyl)oxy]-2-hydroxyphenyl}-4, 6-bis(2,4-dimethylphenyl)-1,3,5-triazine, 2,4-bis(2,4-dimethylphenyl)-6-(2-hydroxy-4-isooctyloxyphenyl)-s-triazine, 2-(4,6-diphenyl-1,3,5-triazine-2-yl)-5-[(hexyl)oxy]-phenol (Tinuvin 1577FF, produced by BASF Japan), etc.

The hydroxybenzophenone-based compound includes 2,2'-dihydroxybenzophenone, 2,2',4,4'-tetrahydroxybenzophenone, 2-hydroxy-4-octoxybenzophenone, etc.

The cyanoacrylate-based compound includes ethyl-2-cyano-3,3-diphenyl acrylate, 2'-ethylhexyl-2-cyano-3,3-diphenyl acrylate, etc.

The malonic acid-ester-based compound includes 2-(1-aryl alkylidene)malonic acid esters, etc. Among others, [(4-methoxyphenyl)-methylene]-dimethyl malonate (Hostavin PR-25, produced by Clariant), and dimethyl 2-(paramethoxybenzylidene)malonate are preferred.

The oxalanilide-based compound includes 2-ethyl-2'-ethoxy-oxalanilide (Sanduvor VSU, produced by Clariant), etc.

Among these, 2-(2'-hydroxy-3'-tert-butyl-5'-hexylphenyl)benzotriazole, 2-(2'-hydroxy-5'-tert-butylphenyl)benzotriazole, 2-{4-[(2-hydroxy-3-dodecyloxypropyl)oxy]-2-hydroxyphenyl}-4,6-bis(2,4-dimethylphenyl)-1,3,5-triazine, and 2,2',4,4'-tetrahydroxybenzophenone are preferred.

[Light Stabilizer]

The light stabilizer includes a hindered amine-based stabilizer, and the molecular weight thereof is preferably 1,000 or less. In this case, the weather resistance of a molded article can be more enhanced. From the same viewpoint, the molecular weight of the light stabilizer is more preferably 900 or less. In addition, the molecular weight of the light stabilizer is preferably 300 or more. In this case, the heat resistance can be more enhanced, and contamination of the mold during molding can be more reliably prevented, as a result, a molded article with more excellent surface appearance can be obtained. From the same viewpoint, the molecular weight of the light stabilizer is more preferably 400 or more. Furthermore, the light stabilizer is preferably a compound having a piperidine structure. The piperidine structure as prescribed herein may be sufficient if it takes on a saturated 6-membered cyclic amine structure, and the piperidine structure also includes those in which part of the piperidine structure is substituted with a substituent. The substituent includes an alkyl group having a carbon number of 4 or less, and a methyl group is particularly preferred. Among others, a compound having a plurality of piperidine structures is preferred, and a compound in which the plurality of piperidine structures are connected through an ester structure is preferred.

Such a light stabilizer includes 4-piperidinol, 2,2,6,6-tetramethyl-4-benzoate, bis(2,2,6,6-tetramethyl-piperidyl) sebacate, bis(1,2,2,6,6-pentamethyl-4-piperidyl)sebacate, tetrakis(2,2,6,6-tetramethylpiperidine-4-carboxylate) 1,2,3,4-butanetetrayl, a condensate of 2,2,6,6-tetramethyl-piperidinol with tridecyl alcohol and 1,2,3,4-butanetetracarboxylic acid, a condensate of 1,2,2,6,6-pentamethyl-4-piperidyl with tridecyl alcohol and tridecyl-1,2,3,4-butanetetracarboxylate, bis(1,2,3,6,6-pentamethyl-4-piperidyl){[3,5-bis(1,1-dimethylethyl)-4-hydroxyphenyl]methyl}butyl malonate, bis(2,2,6,6-tetramethyl-1-(octyloxy)-4-piperidinyl) decanedioate, a reaction product of 1,1-dimethylethylhydroperoxide and octane, 1-{2-[3-(3,5-di-tert-butyl-4-hydroxyphenyl) propionyl oxy]ethyl}-4-[3-(3,5-di-tert-butyl-4-4-hydroxyphenyl)propionyloxy]ethyl]-2,2,6,6-tetramethylpiperidine, tetrakis(1,2,2,6,6-pentamethyl-4-piperidyl) 1,2,3,4-butanetetracarboxylate, poly[{6-(1,1,3,3-tetramethylbutyl)amino-1,3,5-triazine-2,4-diyl}{(2, 2,6,6-tetramethyl-4-piperidyl)imino}hexamethylene {(2,2,6,6-tetramethyl-4-piperidyl)imino}], a condensate of N,N'-bis (2,2,6,6-tetramethyl-4-piperidyl)-1,6-hexadiamine polymer with 2,4,6-trichloro-1,3,5-triazine, a condensate of 1,2,3,4-butanetetracarboxylic acid with 2,2,6,6-tetramethyl-4-piperidinol and β,β,β,β-tetramethyl-3,9-(2,4,8,10-tetraoxaspiro [5,5]undecane-diethanol, N,N'-bis(3-aminopropyl) ethylenediamine-2,4-bis[N-butyl-N-(1,2,2, 6,6-pentamethyl-4-piperidyl)amino]-6-chloro-1,3,5-triazine condensate, a dimethyl succinate/1-(2-hydroxyethyl)-4-hydroxy-2,2,6,6-tetramethylpiperidine polycondensate, etc.

The content of the light stabilizer is preferably from 0.001 to 5 parts by weight per 100 parts by weight of the total of the polycarbonate resin (A) and the aromatic polycarbonate resin (B). In this case, coloring of the polycarbonate resin composition can be more successfully prevented. As a result, for example, when a coloring agent is added, a deep and clear jet-black color can be obtained. Furthermore, in this case, the light resistance of the polycarbonate resin composition can be more enhanced, and for example, even when the polycarbonate resin composition is applied to automotive interior/exterior applications, excellent light resistance can be exerted. The content of the light stabilizer is more preferably from 0.005 to 3 parts by weight, still more preferably from 0.01 to 1 part by weight, per 100 parts by weight of the total of the polycarbonate resin (A) and the aromatic polycarbonate resin (B). Incidentally, the aromatic polycarbonate resin (B) is likely to be decomposed by a hindered amine-based light stabilizer. Accordingly, when the aromatic polycarbonate resin (B) is large in the ratio of the polycarbonate resin (A) and the aromatic polycarbonate resin (B), the amount of the light stabilizer added is preferably set to be smaller.

[Release Agent]

As a release agent for imparting mold releasability at the time of molding, the polycarbonate resin composition may contain from 0.0001 to 2 parts by weight of a fatty acid ester of a polyhydric alcohol per 100 parts by weight of the polycarbonate resin. When the amount of the fatty acid ester of a polyhydric alcohol is adjusted to the range above, the effect of addition is sufficiently obtained, and a molded article can be more reliably prevented from cracking due to a release failure at the time of demolding in the molding processing. Furthermore, in this case, clouding of the resin composition or increase of deposits attached to the mold at the time of molding processing can be more successfully suppressed. The content of the fatty acid ester of a polyhydric alcohol is more preferably from 0.01 to 1.5 parts by weight, and still more preferably from 0.1 to 1 parts by weight.

The fatty acid ester of a polyhydric alcohol is preferably a partial ester or whole ester of a polyhydric alcohol having a carbon number of 1 to 20 with a saturated fatty acid having a carbon number of 10 to 30. The partial ester or whole ester of a polyhydric alcohol with a saturated fatty acid includes stearic acid monoglyceride, stearic acid diglyceride, stearic acid triglyceride, stearic acid monosorbitate, behenic acid monoglyceride, pentaerythritol monostearate, pentaerythritol distearate, pentaerythritol tetrastearate, pentaerythritol tetrapelargonate, propylene glycol monostearate, isopropyl palmitate, sorbitan monostearate, etc. Among these, stearic acid monoglyceride, stearic acid triglyceride, and pentaerythritol tetrastearate are preferably used.

In view of heat resistance and moisture resistance, a whole ester is more preferred as the fatty acid ester of a polyhydric alcohol.

The fatty acid is preferably a higher fatty acid, more preferably a saturated fatty acid having a carbon number of 10 to 30. Such a fatty acid includes myristic acid, lauric acid, palmitic acid, stearic acid, behenic acid, etc.

In the fatty acid ester of a polyhydric alcohol, the polyhydric alcohol is preferably ethylene glycol. In this case, when it is added to the resin, the mold releasability can be enhanced without impairing the transparency of the resin.

In addition, the fatty acid ester of a polyhydric alcohol is preferably a fatty acid diester of a dihydric alcohol. In this case, when it is added to the resin, reduction in the molecular weight of the resin composition under a wet heat environment can be suppressed.

In the present embodiment, the timing and method for adding the release agent to be blended in the polycarbonate resin composition are not particularly limited. The timing of addition includes, for example, in the case of producing the polycarbonate resin by transesterification method, the time when the polymerization reaction is completed; irrespective of the polymerization method, the time when the polycarbonate resin is in the melted state, such as in the middle of kneading of the polycarbonate resin composition and other compounding ingredients; and the time when blending and kneading with the polycarbonate resin in a solid state, such as pellet or powder, is performed using an extruder etc. As the addition method, a method of mixing or kneading the release agent directly with the polycarbonate resin composition may be employed; or the release agent may be added as a high-concentration masterbatch produced using the release agent and a small amount of the polycarbonate resin composition or another resin, etc.

[Another Resin]

The polycarbonate resin composition may also be used as a polymer alloy by kneading it with, for example, one member or two or more members of a synthetic resin such as aromatic polyester, aliphatic polyester, polyamide, polystyrene, polyolefin, acryl, amorphous polyolefin, ABS and AS, and a biodegradable resin such as polylactic acid and polybutylene succinate.

[Inorganic Filler, Organic Filler]

In the polycarbonate resin composition, as long as the design property can be maintained, an inorganic filler such as glass fiber, milled glass fiber, glass flake, glass bead, silica, alumina, titanium oxide, calcium sulfate powder, gypsum, gypsum whisker, barium sulfate, talc, mica, calcium silicate (e.g., wollastonite), carbon black, graphite, iron powder, copper powder, molybdenum disulfide, silicon carbide, silicon carbide fiber, silicon nitride, silicon nitride fiber, brass fiber, stainless steel fiber, potassium titanate fiber and a whisker thereof; a powdery organic filler such as wood powder, bamboo powder, coconut shell flour, cork flour and pulp powder; a balloon-like•spherical organic filler such as crosslinked polyester, polystyrene, styrene-acrylic copolymer and urea resin; and a fibrous organic filler such as carbon fiber, synthetic fiber and natural fiber, may be added.

[Production Method of Polycarbonate Resin Composition]

The polycarbonate resin composition above can be produced by performing an addition step of adding from 0.5 to 1,000 ppm by weight, in terms of metal amount, of the specific compound (C) to those specific polycarbonate resin (A) and aromatic polycarbonate resin (B), and then performing a reaction step of melt-reacting the polycarbonate resin (A) with the aromatic polycarbonate resin (B). In the reaction step, by virtue of the presence of the compound (C), the transesterification reaction of the polycarbonate resin (A) with the aromatic polycarbonate resin (B) is promoted, and a resin composition with high compatibility is obtained. Here, as the polycarbonate resin (A), the aromatic polycarbonate resin (B) and the compound (C), the same as those described above can be used.

The polycarbonate resin composition can be produced by mixing the above-described components in a predetermined ratio at the same time or in an arbitrary order by means of a mixing machine such as tumbler, V-blender, Nauta mixer, Banbury mixer, kneading roll or extruder. Among others, a mixing machine enabling mixing in a reduced-pressure state at the time of melt-mixing is more preferred.

As to the melt-kneader, although whether the type is a twin-screw extruder or a single-screw extruder is not limited as long as it has a configuration capable of achieving mixing in the reduced-pressure state, for the purpose of achieving reactive mixing according to the properties of the specific polycarbonate resin (A) and aromatic polycarbonate resin (B) used, a twin-screw extruder is more preferred.

The mixing temperature of the polycarbonate resin composition is preferably from 200 to 300° C. In this case, the time required for the reactive kneading can be shortened, and the amount of the compound (C) necessary for the reaction can reduced. As a result, not only degradation of the resin or deterioration of the color tone can be more reliably prevented but also physical properties on practical side, such as impact resistance and wet heat resistance, can be more enhanced. From the same viewpoint, the mixing temperature is more preferably from 220 to 280° C.

As to the mixing time, useless elongation thereof must be avoided from the viewpoint of more reliably avoiding degradation of the resin, similarly to the above, and although it is based on a balance with the amount of the compound (C) or the mixing temperature, the mixing time is preferably from 10 to 150 seconds, and more preferably from 10 to 25 seconds. The conditions as to the amount of the compound (C) and the mixing temperature must be set to satisfy the range above.

The melt-reaction in the reaction step is preferably performed under the condition of a vacuum degree of 30 kPa or less. The degree of vacuum is more preferably 25 kPa or less, still more preferably 15 kPa or less. The degree of vacuum as used herein indicates an absolute pressure and is a value calculated according to the conversion formula (101 kPa−(numerical value of vacuum pressure gauge)) after reading a vacuum pressure gauge.

The reaction step is performed under reduced pressure, and the condition of reduced pressure is controlled to the specific range above, whereby in the reaction step, removal of a byproduct that may be produced at the time of transesterification reaction of the polycarbonate resin (A) and the aromatic polycarbonate resin (B) is facilitated. This makes it easy for the transesterification reaction to proceed, as a result, a resin composition with higher compatibility between the polycarbonate resin (A) and the aromatic polycarbonate resin (B) can be produced.

[Molded Body]

The polycarbonate resin composition can be molded by a commonly known method such as injection molding method, extrusion molding method and compression molding method. The molded body obtained by molding has excellent transparency and at the same time, possesses high levels of biogenic substance content rate, heat resistance, wet heat resistance and impact resistance in a balanced manner. Furthermore, in the molded body obtained by molding the polycarbonate resin composition, it is also possible to enhance the color tone, weather resistance, mechanical strength, etc. or decrease the amount of residual low-molecular components or foreign matters. Accordingly, the molded body is suitable for vehicular interior parts.

The above-described polycarbonate resin composition is excellent in the color hue, transparency, heat resistance, weather resistance, mechanical strength, etc. and furthermore, excellent in the color hue under wet heat conditions or stability of optical properties and therefore, can be applied to a wide range of fields including the injection molding field such as electric/electronic parts, automotive parts and glass substitute application; the extrusion molding field such as film or sheet field and bottle or container field; the lens application such as camera lens, finder lens and CCD (Charged Coupled Device) or CMOS (Complementary Metal Oxide Semiconductor) lens; an optical film or optical sheet used for a liquid crystal or organic EL (Electro Luminescence) display, etc., such as retardation film, diffusion sheet, light guide plate and polarizing film; an optical disc, an optical material, and an optical part; and a binder application for fixing a coloring matter, a charge transfer agent, etc.

The above-described polycarbonate resin composition is excellent in the transparency, heat resistance, weather resistance, mechanical strength, etc. and furthermore, excellent in the image clarity even when colored with a coloring agent, etc. and therefore, can be applied to an application such as automotive interior/exterior parts, electric/electronic parts and housing. The automotive exterior part includes, for example, fender, bumper, facia, door panel, side garnish, pillar, radiator grill, side protector, side molding, rear protector, rear molding, various spoilers, hood, roof panel, trunk lid, detachable top, wind reflector, mirror housing, and outer door handle. The automotive interior part includes, for example, instrumental panel, center console panel, meter parts, various switches, car navigation parts, car audio visual parts, and automobile computer parts. The electric/electronic parts and housing include, for example, an exterior part of personal computers such as desktop and notebook, an exterior part of OA (Office Automation) devices such as printer, copier, scanner and facsimile (including a multifunction machine of these), an exterior part of display devices (e.g., CRT, liquid crystal, plasma, projector, organic EL), an exterior part of mouses, etc., switch mechanism parts such key of keyboard and several switches, and an exterior part of game machines (e.g., home game machine, arcade game machine, pinball machine, slot machine). Furthermore, the equipment includes electric OA equipment and household electric appliances, such as personal digital assistance (so-called PDA), cellular phone, portable book (e.g., dictionaries), portable television set, drive for recording media (e.g., CD, MD, DVD, next-generation high density disc, hard disc), reader for recording media (e.g., IC card, smart media, memory stick), optical camera, digital camera, parabolic antenna, electric tool, VTR, iron, hair dryer, rice cooker, microwave oven, hot plate, audio equipment, lighting equipment, refrigerator, air conditioner, air cleaner, negative ion generator and clock.

EXAMPLES

Although the present invention is described in greater detail below by referring to Examples, the present invention is not limited by the following Examples as long as its gist is observed.

Test Example 1

Examples 1-1 to 1-24 and Comparative Examples 1-1 to 1-4

[Evaluation Method I]
In the following Production Examples, Examples 1-1 to 1-24 and Comparative Examples 1-1 to 1-4, the physical properties or characteristics of the polycarbonate resin (A), the aromatic polycarbonate resin (B) and the resin composition were evaluated by the following methods.
(I-1) Measurement of Reduced Viscosity
A sample of the polycarbonate resin (A) or the aromatic polycarbonate resin (B) was dissolved in methylene chloride to prepare a polycarbonate resin solution having a concentration of 0.6 g/dL. The transit time to of the solvent and the transit time t of the solution were measured using an Ubbelohde viscometer manufactured by Moritomo Rika Kogyo Co., Ltd. under the condition of a temperature of 20.0° C.±0.1° C., and the relative viscosity $\eta_{rel}$ was calculated according to the following formula (i). Subsequently, from the relative viscosity $\eta_{rel}$, the specific viscosity $\eta_{sp}$ was determined according to the following formula (ii):

$$\eta_{rel}=t/t_0 \quad (i)$$

$$\eta_{sp}=\eta_{rel}-1 \quad (ii)$$

The obtained specific viscosity $\eta_{sp}$ was divided by the concentration c (g/dL) of the solution to thereby determine the reduced viscosity ($\eta_{sp}/c$). A higher value of the reduced viscosity means a larger molecular weight.
(I-2) Measurement of Melt Viscosity
The melt viscosity of the polycarbonate resin composition was measured using a capillary rheometer, "CAPILO-GRAPH 1B", manufactured by Toyo Seiki Seisaku-Sho, Ltd. under the conditions of a die diameter of 1 mm, a die length of 10 mm, an inflow angle of 90° C., a preheating time of 2 minutes, a measurement temperature of 240° C., and a shear rate in the range of 12.16 to 6,080 sec$^{-1}$ and is a value at a shear rate (SR) of 91.2 sec$^{-1}$. In the measurement of the melt viscosity of the polycarbonate resin, the polycarbonate resin used for the measurement was previously dried at 90° C. for 4 hours or more. The ideal viscosity is a value obtained by multiplying the melt viscosity of each component of the polycarbonate resin composition by the blending ratio (% by weight) and summing the resulting values, and the ratio to the ideal viscosity is a value obtained by dividing the melt viscosity of the polycarbonate resin composition by the ideal viscosity and multiplying the resulting value by 100.

(I-3) Measurement of Glass Transition Temperature (Tg)
Tg of the polycarbonate resin composition is a value of Tmg determined in conformity with the method of JIS-K7121 (1987) from a DSC curve obtained when using a differential scanning calorimeter, "DSC7", manufactured by Perkin Elmer, Inc. and subjecting the resin composition, in a nitrogen gas atmosphere, to temperature rise to 200° C. from 25° C. at a heating rate of 20° C./min, holding at 200° C. for 3 minutes, temperature drop to 25° C. at a cooling rate of 20° C./min, holding at 25° C. for 3 minutes, and again temperature rise to 200° C. at a heating rate of 5° C./min. Furthermore, the singularity in the glass transition temperature was evaluated. Specifically, the singularity was rated "A" when the DSC curve had a single peak, and rated "C" when the DSC curve had a plurality of peaks.
(I-4) Measurement of Metal Amount in Polycarbonate Resin Composition
The metal amount in the polycarbonate resin composition was measured using ICP-MS (inductively coupled plasma mass spectrometer). Specifically, about 0.5 g of a sample of the polycarbonate resin composition was accurately weighed and subjected to closed pressure decomposition with sulfuric acid and nitric acid. For the closed pressure decomposition, a microwave decomposer, MULTIWAV, manufactured by PerkinElmer, Inc. was used. The solution resulting from decomposition was appropriately diluted with pure water and measured by ICP-MS (ELEMENT, manufactured by ThermoQuest). The alkali and alkaline earth metals determined were Li, Na, K, Cs, Mg, Ca, and Ba. Incidentally, the metal amount in Examples 1-1 to 1-24 includes not only metals derived from the compound (C) but also metals (e.g., Ca) derived from the polycarbonate resin (A) or metals (e.g., Cs) derived from the aromatic polycarbonate resin (B).
(I-5) Measurement of Total Light Transmittance
Pellets of the polycarbonate resin composition were dried at 90° C. for 4 hours or more by using a hot-air dryer. The dried pellets were then fed to an injection molding machine (Model J75EII, manufactured by The Japan Steel Works, Ltd.) and molded under the conditions of a resin temperature of 240° C., a mold temperature of 60° C. and a molding cycle of 50 seconds to obtain an injection-molded plate (100 mm (width)×100 mm (length)×2 mm (thickness)). The total light transmittance of the injection-molded plate was measured in conformity to JIS K7136 (2000) with a D65 light source by using a haze meter, "NDH2000", manufactured by Nippon Denshoku Industries Co., Ltd. Here, a total light transmittance of 80% or more was judged to have passed, and when the injection-molded plate was apparently opaque by visual observation, the evaluation result was shown as "opaque" instead of the measured value of the total light transmittance.
(I-6) Wet Heat Resistance Test
A constant-temperature and constant-humidity bath, "HIFLEX FX224P", manufactured by Kusumoto Chemicals, Ltd. was set to 80° C. and 95% RH or to 85° C. and 85% RH, and a test piece of 100 mm or 50 mm (width)×100 mm (length)×2 mm (thickness) was left standing still in the bath for 120 hours or 240 hours to apply a wet heat treatment. Thereafter, the test piece was taken out and measured for the haze, and a difference (ΔHaze) from the haze before the wet heat resistance test was determined. Incidentally, the measurement of haze was performed in conformity to JIS-K7136 (2000) by using a haze meter, "NDH2000", manufactured by Nippon Denshoku Industries Co., Ltd. A larger value of ΔHaze means worse wet heat resistance, and a smaller value means better wet heat resistance. Here, when the injection-molded plate was opaque by visual observation in the measurement of the total light transmittance, implementation of this test (wet heat resistance test) was omitted.

(I-7) Heat Resistance Test

Pellets of the polycarbonate resin composition were dried at 90° C. for 4 hours or more by using a hot-air dryer. The dried pellets were then fed to an injection molding machine (Model J75EII, manufactured by The Japan Steel Works, Ltd.) and molded under the conditions of a resin temperature of 240° C., a mold temperature of 60° C. and a molding cycle of 50 seconds to obtain a multi-purpose test piece Type A described in JIS-K7139 (2009). A test piece having a length of 80 mm, a width of 10 mm and a thickness of 4 mm was cut out from the obtained multi-purpose test piece and measured for the deflection temperature under load by Method A (bending stress applied to test piece: 1.80 MPa) in conformity to JIS-K7191-2 (2007). In this test, a deflection temperature under load of 90° C. or more was judged to have passed, and the deflection temperature under load is preferably 95° C. or more, more preferably 100° C. or more.

(I-8) High-Rate Test

Pellets of the polycarbonate resin composition were dried at 90° C. for 4 hours or more by using a hot-air dryer. The dried pellets were then fed to an injection molding machine (Model J75EII, manufactured by The Japan Steel Works, Ltd.) and molded under the conditions of a resin temperature of 240° C., a mold temperature of 60° C. and a molding cycle of 50 seconds to obtain an injection-molded plate (100 mm (width)×100 mm (length)×2 mm (thickness)). A high-rate test of the obtained injection-molded plate was conducted using "Shimadzu Hydroshot Model HITS-P10" manufactured by Shimadzu Corp. under the conditions of a temperature of 23° C. or −20° C., a striker diameter of ⅝ inches, a support base diameter of 40 mm, and a test speed of 4.4 m/s. The ductile fracture rate was determined by dividing the scores of ductile-fractured samples out of samples evaluated on a 5-score scale by evaluation scores and multiplying the resulting value by 100.

(I-9) Measurement of Biogenic Substance Content Rate

Radiocarbon 14 ($C^{14}$) is produced at a constant rate by a cosmic ray in the atmosphere and lost at a constant rate (half-life: 5,370 years) and therefore, is present in a constant amount in nature. Although plants taking up carbon dioxide in the atmosphere contains a constant amount of $C^{14}$, when carbon dioxide assimilation ceases due to milling, etc., the radiocarbon is lost at a constant rate, and radioactive dating is established by utilizing this property. Fossil fuel is not subject to the effect of a cosmic ray for a long time and is therefore deprived of all $C^{14}$. On the other hand, in the case of a bio-derived chemical, a long time has not passed since a stop of the supply of $C^{14}$, and it can be said that the $C^{14}$ content is almost at a constant value.

The method for calculating the biogenic substance content by using the above-described method is specifically described. First, the ISB carbonate constitutional unit of ISB-PC consists of 6 carbons of bio-derived ISB and 1 DPC-derived carbon of fossil fuel and therefore, the biogenic substance content rate of ISB-PC is number of bio-derived carbons: 6/number of all carbons: 7=85.7%. Here, the effect of a terminal is neglected, because the polymer chain is sufficiently long. In the case of a copolymerized polycarbonate resin as in Production Example 1-1 described later, since CHDM is a fossil fuel-derived raw material, the biogenic substance content of CHDM-PC is number of bio-derived carbons: 0/number of all carbons: 9=0%. In the case of ISB/CHDM=70/30 mol % of Production Example 1-1, only the ISB-PC component is bio-derived and therefore, the biogenic substance content rate is 85.7%×70 mol %=60%.

Next, in the case of a blend of a polycarbonate resin (A) and an aromatic polycarbonate resin (B) as in Examples, since the aromatic polycarbonate resin (B) is a polymer produced from a fossil fuel-derived raw material, the biogenic substance content rate is 0%. In Examples where the resins are blended on a weight ratio basis, the molar mass (unit: g/mol) of each polycarbonate resin is calculated, the weight of each is divided by the molar mass, and the resulting value is converted to the molar fraction. Then, the biogenic substance content of the blend is calculated from the product of the biogenic substance content of the polycarbonate resin (A) and the molar fraction thereof. Incidentally, with respect to the calculation of the biogenic substance, the content rate is calculated only with resin components, and the components such as compound (C), heat stabilizer and release agent are not taken into account.

[Raw Materials Used]

The abbreviations and manufacturers of the compounds used in Examples and Comparative Examples below are as follows.

<Dihydroxy Compound>

ISB: Isosorbide [produced by Roquette Froeres]
CHDM: 1,4-Cyclohexanedimethanol [produced by SK Chemicals]
TCDDM: Tricyclodecane dimethanol [produced by OXEA]
BPC: 2,2-Bis(4-hydroxy-3-methylphenyl)propane [produced by Honshu Chemical Industry Co., Ltd.]

<Carbonic Acid Diester>

DPC: Diphenyl carbonate [produced by Mitsubishi Chemical Corporation]

<Catalyst Deactivator (Acidic Compound (E)>

Phosphorous acid [produced by Taihei Chemical Industrial Co., Ltd.] (molecular weight: 82.0)

<Heat Stabilizer (Antioxidant)>

Irganox 1010: Pentaerythrityl-tetrakis[3-(3,5-di-tert-butyl-4-hydroxyphenyl)propionate] [produced by BASF]
AS2112: Tris(2,4-di-tert-butylphenyl)phosphite [produced by ADEKA Corporation](molecular weight: 646.9)

<Release Agent>

E-275: Ethylene glycol distearate [produced by NOF Corporation]

[Production Example 1-1 of Polycarbonate Resin (A)]

Using continuous polymerization equipment consisting of three vertical stirring reactors, one horizontal stirring reactor and a twin-screw extruder, polymerization of a polycarbonate resin was performed. Specifically, each of ISB, CHDM and DPC was dissolved in a tank, and ISB, CHDM and DPC were continuously fed to the first vertical stirring reactor at a flow rate of 35.2 kg/hr, 14.9 kg/hr and 74.5 kg/hr, respectively (in a molar ratio of ISB/CHDM/DPC=0.700/0.300/1.010). Simultaneously, an aqueous solution of calcium acetate monohydrate was fed to the first vertical stirring reactor such that the amount added of calcium acetate monohydrate as a catalyst becomes 1.5 µmol per mol of all dihydroxy compounds. The reaction temperature, internal pressure and residence time of each reactor were: first vertical stirring reactor: 190° C., 25 kPa and 90 minutes, second vertical stirring reactor: 195° C., 10 kPa and 45 minutes, third vertical stirring reactor: 210° C., 3 kPa and 45 minutes, fourth horizontal stirring reactor: 225° C., 0.5 kPa and 90 minutes. The operation was performed while finely controlling the internal pressure of the fourth horizontal reactor such that the reduced viscosity of the obtained polycarbonate resin becomes from 0.41 to 0.43 dL/g.

The polycarbonate resin was withdrawn at an amount of 60 kg/hr from the fourth horizontal stirring reactor, and the resin in the molten state was fed to a vented twin-screw extruder [TEX30α, manufactured by The Japan Steel Works, Ltd., L/D: 42.0, L (mm): length of screw, D (mm): diameter of screw]. The polycarbonate resin having passed through the extruder was subsequently passed in the molten state through a candle-type filter (made of SUS316) having an opening size of 10 μm to filter foreign matters. Thereafter, the polycarbonate resin was discharged in the form of a strand from a die, water-cooled, solidified and then pelletized by a rotary cutter to obtain pellets of a copolymerized polycarbonate resin having a molar ratio of ISB/CHDM of 70/30 mol %.

The extrude has three vacuum vent ports, and residual low molecular components in the resin were devolatilized and removed there. Before the second vent, 2,000 ppm by weight of water relative to the resin was added to perform waterpouring devolatilization. Before the third vent, Irganox 1010, AS2112, and E-275 were added in an amount of 0.1 parts by weight, 0.05 parts by weight, and 0.3 parts by weight, respectively, per 100 parts by weight of the polycarbonate resin. In this way, an ISB/CHDM copolymerized polycarbonate resin was obtained. To the polycarbonate resin, 0.65 ppm by weight of phosphorous acid (0.24 ppm by weight as the amount of phosphorus atom) was added as a catalyst deactivator. Here, the phosphorous acid was added as follows. A masterbatch was prepared by coating and mixing the pellets of the polycarbonate resin obtained in Production Example 1-1 with an ethanol solution of phosphorous acid, and fed before the first vent port of the extrude (from the resin feed port side of the extruder) such that the amount of the masterbatch becomes 1 part by weight per 100 parts by weight of the polycarbonate resin in the extruder.

The polycarbonate resin (A) obtained in Production Example 1-1 is designated as "PC-A1". The melt viscosity (240° C., shear rate: 91.2 sec$^{-1}$) of PC-A1 was 720 Pa·s.

[Production Example 1-2 of Polycarbonate Resin (A)]

A polycarbonate resin having a molar ratio of ISB/CHDM of 50/50 mol % was obtained by manufacturing the resin in the same manner as in Production Example 1-1 except that the amounts of respective raw materials fed to the reactor were changed to 25.4 kg/hr of ISB, 25.0 kg/hr of CHDM, and 74.8 kg/hr of DPC (as a molar ratio, ISB/CHDM/DPC=0.500/0.500/1.006), the amount of calcium acetate monohydrate per mol of all dihydroxy compounds was changed to 1.5 μmol, and the reduced viscosity of the obtained polycarbonate resin was adjusted to become from 0.60 to 0.63 dL/g. To the polycarbonate resin, 0.65 ppm by weight of phosphorous acid (0.24 ppm by weight as the amount of phosphorus atom) was added as a catalyst deactivator. Here, the phosphorous acid was added as follows. A masterbatch was prepared by coating and mixing the pellets of the polycarbonate resin obtained in Production Example 1-2 with an ethanol solution of phosphorous acid, and fed before the first vent port of the extrude (from the resin feed port side of the extruder) such that the amount of the masterbatch becomes 1 part by weight per 100 parts by weight of the polycarbonate resin in the extruder.

The polycarbonate resin (A) obtained in Production Example 1-2 is designated as "PC-A2". The melt viscosity (240° C., shear rate: 91.2 sec$^{-1}$) of PC-A2 was 1,120 Pa·s.

[Production Example 1-3 of Polycarbonate Resin (A)]

Into a polymerization reaction apparatus equipped with a reflux condenser controlled to a temperature of 100° C. and a stirring blade, ISB, CHDM and DPC purified by distillation to a chloride ion concentration of 10 ppb or less were charged to have a molar ratio of ISB/CHDM/DPC=0.27/0.73/1.00, and furthermore, an aqueous solution of calcium acetate monohydrate was charged such that the amount added of calcium acetate monohydrate as a catalyst becomes 1.5 μmol per mol of all dihydroxy compounds. After thorough purging with nitrogen, the system was heated by a heating medium and at the point when the internal temperature reached 100° C., stirring was started to melt and homogenize the contents under control to keep the internal temperature at 100° C. Thereafter, temperature rise was started and by adjusting the internal temperature to reach 210° C. over 40 minutes, at the point when the internal temperature reached 210° C., the system was controlled to keep this temperature. At the same time, pressure reduction was started, and the internal pressure was adjusted to reach 13.3 kPa (absolute pressure, hereinafter the same) in 90 minutes after reaching the internal temperature of 210° C. While keeping the pressure above, the system was held for another 30 minutes. Phenol vapor generated as a byproduct along with the polymerization reaction was introduced into the reflux condenser using, as a cooling medium, steam controlled to 100° C. in terms of the temperature at the inlet to the reflux condenser, and monomer components contained in a slight amount in the phenol vapor were returned to the polymerization reactor. Uncondensed phenol vapor was subsequently introduced into a condenser using, as a cooling medium, warm water at 45° C. and recovered. After the pressure was once returned to atmospheric pressure, the thus-oligomerized contents were transferred to another polymerization reaction apparatus equipped with a stirring blade and a reflux condenser controlled in the same manner as above and by starting temperature rise and pressure reduction, the internal temperature and the pressure were adjusted to reach 210° C. and 200 Pa, respectively, over 60 minutes. Thereafter, the internal temperature and the pressure were adjusted to reach 220° C. and 133 Pa or less, respectively, over 20 minutes, and at the point when a predetermined stirring power was achieved, the pressure was recovered. A polycarbonate resin in the molten state discharged from the outlet of the polymerization reaction apparatus was pelletized by a pelletizer to obtain pellets. The reduced viscosity was 0.63 dl/g.

In this way, a polycarbonate resin having a molar ratio of ISB/CHDM of 27/73 mol % was obtained. The polycarbonate resin (A) obtained in Production Example 1-3 is designated as "PC-A3". The melt viscosity (240° C., shear rate: 91.2 sec$^{1-}$) of PC-A3 was 640 Pa·s.

[Production Example 1-4 of Polycarbonate Resin (A)]

Into a polymerization reaction apparatus equipped with a reflux condenser controlled to a temperature of 100° C. and a stirring blade, ISB, TCDDM and DPC purified by distillation to a chloride ion concentration of 10 ppb or less were charged to have a molar ratio of ISB/TCDDM/DPC=0.70/0.30/1.00, and furthermore, an aqueous solution of calcium acetate monohydrate was charged such that the amount added of calcium acetate monohydrate as a catalyst becomes 1.5 μmol per mol of all dihydroxy compounds. By performing thorough purging with nitrogen, the oxygen concentration within the reaction apparatus was adjusted to be from 0.0005 to 0.001 vol %. Subsequently, the system was heated by a heating medium and at the point when the internal temperature reached 100° C., stirring was started to melt and homogenize the contents under control to keep the internal temperature at 100° C. Thereafter, temperature rise was started and by adjusting the internal temperature to reach 210° C. over 40 minutes, at the point when the internal temperature reached 210° C., the system was controlled to keep this temperature. At the same time, pressure reduction was started, and the pressure was adjusted to reach 13.3 kPa in 90 minutes after reaching 210° C. While keeping this pressure, the system was held for another 60 minutes. Phenol vapor generated as a byproduct along with the polymerization reaction was introduced into the reflux condenser using, as a cooling medium, steam controlled to 100° C. in terms of the temperature at the inlet to the reflux condenser, and dihydroxy compound and carbonic acid diester contained in a slight amount in the phenol vapor were returned to the polymerization reactor. Uncondensed phenol vapor was subsequently introduced into a condenser using, as a cooling medium, warm water at 45° C. and recovered. After the pressure was once returned to atmospheric pressure, the thus-oligomerized contents were transferred to another polymerization reaction apparatus equipped with a stirring blade and a reflux condenser controlled in the same manner as above and by starting temperature rise and pressure reduction, the internal temperature and the pressure were adjusted to reach 220° C. and 200 Pa, respectively, over 60 minutes. Thereafter, the internal temperature and the pressure were adjusted to reach 230° C. and 133 Pa or less, respectively, over 20 minutes, and at the point when a predetermined stirring power was achieved, the pressure was returned to atmospheric pressure. The contents were withdrawn in the form of a strand, and the polycarbonate copolymer was pelletized by a rotary cutter. In this way, a polycarbonate resin having a molar ratio of ISB/TCDDM of 70/30 mol % was obtained. To the polycarbonate resin, 0.65 ppm by weight of phosphorous acid (0.24 ppm by weight as the amount of phosphorus atom) was added. Here, the phosphorous acid was added as follows. A masterbatch was prepared by coating and mixing the pellets of the polycarbonate resin obtained in Production Example 1-4 with an ethanol solution of phosphorous acid, and fed before the first vent port of the extrude (from the resin feed port side of the extruder) such that the amount of the masterbatch becomes 1 part by weight per 100 parts by weight of the polycarbonate resin in the extruder.

The polycarbonate resin (A) obtained in Production Example 1-4 is designated as "PC-A4". The melt viscosity (240° C., shear rate: 91.2 sec$^{-1}$) of PC-A4 was 1,120 Pa·s.

[Aromatic Polycarbonate Resin (B)]
  PC-B1: Novarex 7022J produced by Mitsubishi Engineering-Plastics Corp. (an aromatic polycarbonate resin containing 100 mol % of bisphenol A constitutional unit, reduced viscosity (240° C., shear rate: 91.2 sec$^{-1}$): 3,260 Pa·s)
  PC-B2: An aromatic polycarbonate resin obtained by the following Production Example.
  PC-B3: APEC 1897 (an aromatic polycarbonate resin composed of a copolymer of bisphenol A and 1,1-bis (4-hydroxy-3,3,5-trimethylphenyl)cyclohexane, melt viscosity (240° C., shear rate: 91.2 sec$^{-1}$): unmeasurable due to too high viscosity)

[Production Example of Aromatic Polycarbonate Resin (PC-B2)

An aqueous cesium carbonate solution was added to a mixture of 181.8 kg of BPC and 57.7 kg of DPC. The amount added was adjusted such that the amount of cesium carbonate becomes 2.0 µmol per mol of BPC as a dihydroxy compound. The mixture was then charged into a first reactor having an internal volume of 400 L and being equipped with a stirrer, a heating medium jacket, a vacuum pump and a reflux condenser. Next, an operation of reducing the pressure within the first reactor to 1.33 kPa (10 Torr) and recovering the atmospheric pressure with nitrogen was repeated 10 times, and the inside of the first reactor was thereby purged with nitrogen. Thereafter, the internal temperature of the first reactor was gradually raised by flowing a heating medium at a temperature of 230° C. to the heating medium jacket, and the mixture was thereby melted. The molten mixture was then transferred to a second reactor. Here, the second reactor has an internal volume of 400 L and is equipped with a stirrer, a heating medium jacket, a vacuum pump and a reflux condenser. The molten mixture within the second reactor was stirred by a stirrer adjusted to a rotational speed of 60 rpm and at the same time, the internal temperature of the second reactor was kept at 220° C. by controlling the temperature within the heating medium jacket. While distilling off phenol generated as a byproduct by an oligomerization reaction of BPC and DPC occurring inside of the second reactor, the pressure within the second reactor was reduced to, in terms of absolute pressure, 13.3 kPa (100 Torr) from 101.3 kPa (760 Torr). The inside of the second reactor was then stirred at a rotational speed of 30 rpm, the internal temperature was raised by means of the heating medium jacket, and the pressure within the second rector was reduced to, in terms of absolute pressure, 13.3 kPa from 101.3 kPa. Thereafter, phenol was removed outside the system by distillation by continuing temperature rise and reducing the internal temperature to, in terms of absolute pressure, 399 Pa (3 Torr) from 13.3 kPa. Furthermore, temperature rise was continued and after the absolute pressure within the second reactor reached 70 Pa (about 0.5 Torr), a polycondensation reaction was performed by keeping the pressure (70 Pa). At this time, the stirring rotation number was set to 10 rpm according to the stirring power, and the final internal temperature within the second reactor was set to 275° C. The polycondensation reaction was completed when the stirrer of the second reactor reached a predetermined stirring power. The polymerization reaction time in the second reactor was 310 minutes. In this way, an aromatic polycarbonate resin (PC-B2) was obtained. The melt viscosity (240° C., shear rate: 91.2 sec$^{-1}$) of PC-B2 was 3,040 Pa·s.

Example 1-1

In this Example, PC-A1 was used as the polycarbonate resin (A), PC-B1 was used as the aromatic polycarbonate resin (B), and powdered sodium hydrogencarbonate (produced by Wako Pure Chemical Industries, Ltd., special grade) was used as the compound (C). More specifically, 70 parts by weight of the polycarbonate resin (A), 30 parts by weight of the polycarbonate resin (B), and 20 ppm by weight, in terms of metal (Na equivalent), of the compound (C) were blended and kneaded using a twin-screw kneader (TEX-30α, manufactured by The Japan Steel Works, Ltd. (L/D=52.5, L (mm): length of screw, D (mm): diameter of screw)) to perform a melt-reaction of the polycarbonate resin (A) and the aromatic polycarbonate resin (B). The ratio of the total length $L_t$ of the kneading zone to the diameter D (mm) of the kneader screw is 6 ($L_t$/D=6), and the kneading conditions are a flow rate: 20 kg/h, a rotational speed of screw: 200 rpm, and a cylinder temperature: 230° C. The extruder has two vacuum vent ports, and the kneading was performed under the condition of a vent vacuum degree of 11 kPa. The resin composition after the melt-reaction by kneading was extruded in the form of a strand and, through a water cooling step, cut into a pellet shape to obtain pellets of the polycarbonate resin composition.

Subsequently, the pellets obtained were dried by a hot-air dryer at temperature of 100° C. for 5 hours, and injection molding of the pellet was then performed using a 75-ton injection molding machine (EC-75, manufactured by Toshiba Machine Co., Ltd.). The molding conditions are a mold temperature: 60° C. and a cylinder temperature: 240° C. In this way, a test piece composed of a plate-like molded body of 100 mm (width)×100 mm (length)×2 mm (thickness)) was obtained. In addition, an ISO tensile test piece was obtained by performing the molding in the same manner. Using these test pieces, the above-described evaluations were performed, and the results obtained are shown in Table 1.

Example 1-2

A polycarbonate resin composition was manufactured in the same manner as in Example 1-1 except for changes in (1) and (2) below, and a molded body (test piece) was manufactured using the resin composition. Evaluation results of this Example are shown in Table 1.

(1) The amount added (Na equivalent) of sodium hydrogencarbonate used as the compound (C) was changed to 10 ppm from 20 ppm.

(2) The vent vacuum degree was changed to 6 kPa from 11 kPa.

Example 1-3

A polycarbonate resin composition was manufactured in the same manner as in Example 1-1 except for changes in (1) to (3) below, and a molded body (test piece) was manufactured using the resin composition. Evaluation results of this Example are shown in Table 1.

(1) The amount added (Na equivalent) of sodium hydrogencarbonate used as the compound (C) was changed to 10 ppm from 20 ppm.

(2) At the time of again performing melt kneading after manufacturing a polycarbonate resin composition in the same manner as in Example 1-1, an acidic compound (E) composed of phosphorous acid was added as a catalyst deactivator. The amount added was 0.5 times by mol relative to the amount added of the compound (C).

(3) The vent vacuum degree was changed to 6 kPa from 11 kPa.

Example 1-4

A polycarbonate resin composition was manufactured in the same manner as in Example 1-1 except for changes in (1) to (3) below, and a molded body (test piece) was manufactured using the resin composition. Evaluation results of this Example are shown in Table 1.

(1) The amount added (Na equivalent) of sodium hydrogencarbonate used as the compound (C) was changed to 10 ppm from 20 ppm.

(2) At the time of again performing melt kneading after manufacturing a polycarbonate resin composition in the same manner as in Example 1-1, an acidic compound (E) composed of phosphorous acid was added as a catalyst deactivator. The amount added was 1 times by mol relative to the amount added of the compound (C).

(3) The vent vacuum degree was changed to 6 kPa from 11 kPa.

Example 1-5

A polycarbonate resin composition was manufactured in the same manner as in Example 1-1 except for changes in (1) to (3) below, and a molded body (test piece) was manufactured using the resin composition. Evaluation results of this Example are shown in Table 1.

(1) The amount added (Na equivalent) of sodium hydrogencarbonate used as the compound (C) was changed to 10 ppm from 20 ppm.

(2) At the time of again performing melt kneading after manufacturing a polycarbonate resin composition in the same manner as in Example 1-1, an acidic compound (E) composed of phosphorous acid was added as a catalyst deactivator. The amount added was 1.5 times by mol relative to the amount added of the compound (C).

(3) The vent vacuum degree was changed to 6 kPa from 11 kPa.

Example 1-6

A polycarbonate resin composition was manufactured in the same manner as in Example 1-1 except for changes in (1) to (3) below, and a molded body (test piece) was manufactured using the resin composition. Evaluation results of this Example are shown in Table 1.

(1) The amount added (Na equivalent) of sodium hydrogencarbonate used as the compound (C) was changed to 10 ppm from 20 ppm.

(2) At the time of again performing melt kneading after manufacturing a polycarbonate resin composition in the same manner as in Example 1-1, an acidic compound (E) composed of phosphorous acid was added as a catalyst deactivator. The amount added was 2 times by mol relative to the amount added of the compound (C).

(3) The vent vacuum degree was changed to 6 kPa from 11 kPa.

Example 1-7

A polycarbonate resin composition was manufactured in the same manner as in Example 1-1 except for changes in (1) to (5) below, and a molded body (test piece) was manufactured using the resin composition. Evaluation results of this Example are shown in Table 1.

(1) Sodium hydrogencarbonate used as the compound (C) was changed to an aqueous sodium hydroxide solution having a concentration of 0.4% by weight. The amount added (Na equivalent) was 100 ppm.

(2) The total length of the kneading zone of the kneader screw was changed to L/D=21.5 from L/D=6.

(3) The number of vacuum vent ports was changed to 1 from 2.

(4) The vent vacuum degree was changed to 21 kPa from 11 kPa.

(5) The flow rate in the kneading conditions was changed to 10 kg/h from 20 kg/h.

Example 1-8

A polycarbonate resin composition was manufactured in the same manner as in Example 1-1 except for changes in (1) and (2) below, and a molded body (test piece) was manufactured using the resin composition. Evaluation results of this Example are shown in Table 1.

(1) Sodium hydrogencarbonate used as the compound (C) was changed to cesium carbonate (powder). The amount added (Cs equivalent) was 10 ppm by weight.

(2) The vent vacuum degree was changed to 6 kPa from 11 kPa.

Example 1-9

A polycarbonate resin composition was manufactured in the same manner as in Example 1-1 except for changes in (1) and (2) below, and a molded body (test piece) was manufactured using the resin composition. Evaluation results of this Example are shown in Table 1.
(1) Sodium hydrogencarbonate used as the compound (C) was changed to cesium carbonate (powder). The amount added (Cs equivalent) was 5 ppm by weight.
(2) The vent vacuum degree was changed to 6 kPa from 11 kPa.

Example 1-10

A polycarbonate resin composition was manufactured in the same manner as in Example 1-1 except for changes in (1) to (3) below, and a molded body (test piece) was manufactured using the resin composition. Evaluation results of this Example are shown in Table 1.
(1) Sodium hydrogencarbonate used as the compound (C) was changed to cesium carbonate (powder). The amount added (Cs equivalent) was 5 ppm by weight.
(2) At the time of again performing melt kneading after manufacturing a polycarbonate resin composition in the same manner as in Example 1-1, an acidic compound (E) composed of phosphorous acid was added as a catalyst deactivator. The amount added was 2 times by mol relative to the amount added of the compound (C).
(3) The vent vacuum degree was changed to 6 kPa from 11 kPa.

Example 1-11

A polycarbonate resin composition was manufactured in the same manner as in Example 1-1 except for changes in (1) to (3) below, and a molded body (test piece) was manufactured using the resin composition. Evaluation results of this Example are shown in Table 1.
(1) Sodium hydrogencarbonate used as the compound (C) was changed to sodium chloride (powder). The amount added (Na equivalent) was 100 ppm by weight.
(2) The total length of the kneading zone of the kneader screw was changed to L/D=18 from L/D=6.
(3) The vent vacuum degree was changed to 21 kPa from 11 kPa.

Example 1-12

A polycarbonate resin composition was manufactured in the same manner as in Example 1-1 except for changes in (1) and (2) below, and a molded body (test piece) was manufactured using the resin composition. Evaluation results of this Example are shown in Table 1.
(1) Sodium hydrogencarbonate used as the compound (C) was changed to potassium carbonate (powder). The amount added (K equivalent) was 3 ppm by weight.
(2) The vent vacuum degree was changed to 6 kPa from 11 kPa.

Example 1-13

A polycarbonate resin composition was manufactured in the same manner as in Example 1-1 except for changes in (1) to (3) below, and a molded body (test piece) was manufactured using the resin composition. Evaluation results of this Example are shown in Table 2.
(1) Sodium hydrogencarbonate used as the compound (C) was changed to potassium carbonate (powder). The amount added (K equivalent) was 3 ppm by weight.
(2) At the time of again performing melt kneading after manufacturing a polycarbonate resin composition in the same manner as in Example 1-1, an acidic compound (E) composed of phosphorous acid was added as a catalyst deactivator. The amount added was 2 times by mol relative to the amount added of the compound (C).
(3) The vent vacuum degree was changed to 6 kPa from 11 kPa.

Example 1-14

A polycarbonate resin composition was manufactured in the same manner as in Example 1-1 except for changes in (1) to (4) below, and a molded body (test piece) was manufactured using the resin composition. Evaluation results of this Example are shown in Table 2.
(1) The blending ratio of the polycarbonate resin (A) was changed to 90 parts by weight, and the blending ratio of the aromatic polycarbonate resin (B) was changed to 10 parts by weight.
(2) Sodium hydrogencarbonate used as the compound (C) was changed to potassium carbonate (powder). The amount added (K equivalent) was 3 ppm by weight.
(3) The flow rate in the kneading conditions was changed to 10 kg/h from 20 kg/h.
(4) The vent vacuum degree was changed to 6 kPa from 11 kPa.

Example 1-15

A polycarbonate resin composition was manufactured in the same manner as in Example 1-1 except for changes in (1) to (4) below, and a molded body (test piece) was manufactured using the resin composition. Evaluation results of this Example are shown in Table 2.
(1) The blending ratio of the polycarbonate resin (A) was changed to 50 parts by weight, and the blending ratio of the aromatic polycarbonate resin (B) was changed to 50 parts by weight.
(2) Sodium hydrogencarbonate used as the compound (C) was changed to potassium carbonate (powder). The amount added (K equivalent) was 3 ppm by weight.
(3) The flow rate in the kneading conditions was changed to 10 kg/h from 20 kg/h.
(4) The vent vacuum degree was changed to 6 kPa from 11 kPa.

Example 1-16

A polycarbonate resin composition was manufactured in the same manner as in Example 1-1 except for changes in (1) to (4) below, and a molded body (test piece) was manufactured using the resin composition. Evaluation results of this Example are shown in Table 2.
(1) PC-A1 used as the polycarbonate resin (A) was changed to PC-A4.
(2) Sodium hydrogencarbonate used as the compound (C) was changed to potassium carbonate (powder). The amount added (K equivalent) was 3 ppm by weight.
(3) The flow rate in the kneading conditions was changed to 10 kg/h from 20 kg/h.
(4) The vent vacuum degree was changed to 6 kPa from 11 kPa.

Example 1-17

A polycarbonate resin composition was manufactured in the same manner as in Example 1-1 except for changes in (1) to (4) below, and a molded body (test piece) was manufactured using the resin composition. Evaluation results of this Example are shown in Table 2.

(1) PC-B1 used as the aromatic polycarbonate resin (B) was changed to PC-B2. The amount added was 5 ppm by weight.

(2) Sodium hydrogencarbonate used as the compound (C) was changed to potassium carbonate (powder). The amount added (K equivalent) was 5 ppm by weight.

(3) The flow rate was changed to 10 kg/h from 20 kg/h.

(4) The vent vacuum degree was changed to 6 kPa from 11 kPa.

Example 1-18

A polycarbonate resin composition was manufactured in the same manner as in Example 1-1 except for changes in (1) to (4) below, and a molded body (test piece) was manufactured using the resin composition. Evaluation results of this Example are shown in Table 2.

(1) PC-B1 used as the aromatic polycarbonate resin (B) was changed to PC-B3.

(2) Sodium hydrogencarbonate used as the compound (C) was changed to potassium carbonate (powder). The amount added (K equivalent) was 5 ppm by weight.

(3) The flow rate was changed to 10 kg/h from 20 kg/h.

(4) The vent vacuum degree was changed to 6 kPa from 11 kPa.

Example 1-19

A polycarbonate resin composition was manufactured in the same manner as in Example 1-1 except for changes in (1) to (4) below, and a molded body (test piece) was manufactured using the resin composition. Evaluation results of this Example are shown in Table 2.

(1) PC-A1 used as the polycarbonate resin (A) was changed to PC-A2.

(2) Sodium hydrogencarbonate used as the compound (C) was changed to potassium carbonate (powder). The amount added (K equivalent) was 3 ppm by weight.

(3) The flow rate was changed to 10 kg/h from 20 kg/h.

(4) The vent vacuum degree was changed to 6 kPa from 11 kPa.

Example 1-20

A polycarbonate resin composition was manufactured in the same manner as in Example 1-1 except for changes in (1) to (4) below, and a molded body (test piece) was manufactured using the resin composition. Evaluation results of this Example are shown in Table 2.

(1) PC-A1 used as the polycarbonate resin (A) was changed to PC-A2.

(2) Sodium hydrogencarbonate used as the compound (C) was changed to calcium hydroxide (powder). The amount added (Ca equivalent) was 500 ppm by weight.

(3) The flow rate was changed to 10 kg/h from 20 kg/h.

(4) The vent vacuum degree was changed to 6 kPa from 11 kPa.

Example 1-21

A polycarbonate resin composition was manufactured in the same manner as in Example 1-1 except for a change in (1) below, and a molded body (test piece) was manufactured using the resin composition. Evaluation results of this Example are shown in Table 2.

(1) Sodium hydrogencarbonate used as the compound (C) was changed to sodium chloride (powder). The amount added (Na equivalent) was 10 ppm by weight.

Example 1-22

A polycarbonate resin composition was manufactured in the same manner as in Example 1-1 except for a change in (1) below, and a molded body (test piece) was manufactured using the resin composition. Evaluation results of this Example are shown in Table 2.

(1) Sodium hydrogencarbonate used as the compound (C) was changed to lithium acetate. The amount added (Li equivalent) was 10 ppm by weight.

Example 1-23

A polycarbonate resin composition was manufactured in the same manner as in Example 1-1 except for a change in (1) below, and a molded body (test piece) was manufactured using the resin composition. Evaluation results of this Example are shown in Table 2.

(1) Sodium hydrogencarbonate used as the compound (C) was changed to lithium stearate. The amount added (Li equivalent) was 3 ppm by weight.

Example 1-24

A polycarbonate resin composition was manufactured in the same manner as in Example 1-1 except for a change in (1) below, and a molded body (test piece) was manufactured using the resin composition. Evaluation results of this Example are shown in Table 2.

(1) Sodium hydrogencarbonate used as the compound (C) was changed to sodium orthosilicate. The amount added (Na equivalent) was 10 ppm by weight.

Comparative Example 1-1

A polycarbonate resin composition was manufactured in the same manner as in Example 1-1 except for changes in (1) and (2) below, and a molded body (test piece) was manufactured using the resin composition. Evaluation results of this Example are shown in Table 3.

Incidentally, the polycarbonate resin composition of this Example had a cesium amount of 0.2 ppm by weight and a calcium amount of 0.2 ppm by weight. The metal amounts were measured by the above-described ICP-MS. In this Example, the compound (C) was not added separately from the polycarbonate resin (A) and the aromatic polycarbonate resin (B) at the time of production of the resin composition and therefore, those metal amounts were derived from the polycarbonate resin (A) and the aromatic polycarbonate resin (B). The content of at least one kind of compound (C) selected from compounds of Group 1 and Group II metals of the long-form periodic table, contained in the polycarbonate resin composition of this Example, was 0.4 ppm by weight. As to the metal amounts derived from the polycarbonate resin (A) and the aromatic polycarbonate resin (B), the same holds true for Comparative Examples 1-2 to 1-4 described later.

(1) The amount added of the compound (C) added at the time of production of the resin composition was changed to 0.

(2) The vent vacuum degree was changed to 21 kPa from 11 kPa.

Comparative Example 1-2

A polycarbonate resin composition was manufactured in the same manner as in Example 1-1 except for changes in (1) to (4) below, and a molded body (test piece) was manufactured using the resin composition. Evaluation results of this Example are shown in Table 3.

(1) PC-A1 used as the polycarbonate resin (A) was changed to PC-A3.
(2) The amount added of the compound (C) was changed to 0.
(3) The flow rate was changed to 10 kg/h from 20 kg/h.
(4) The vent vacuum degree was changed to 6 kPa from 11 kPa.

Comparative Example 1-3

A polycarbonate resin composition was manufactured in the same manner as in Example 1-1 except for a change in (1) below, and a molded body (test piece) was manufactured using the resin composition. Evaluation results of this Example are shown in Table 3.

(1) Sodium hydrogencarbonate used as the compound (C) was changed to tetra-n-butoxytitanium (hereinafter, simply referred to as TBT). The amount added was 1,000 ppm by weight.

Comparative Example 1-4

A polycarbonate resin composition was manufactured in the same manner as in Example 1-1 except for changes in (1) and (2) below, and a molded body (test piece) was manufactured using the resin composition. Evaluation results of this Example are shown in Table 3.

(1) The vent vacuum degree was changed to 101 kPa from 11 kPa.
(2) The amount (Na equivalent) of sodium hydrogencarbonate used as the compound (C) was changed to 10 ppm by weight.

TABLE 1

| | | | Example 1-1 | Example 1-2 | Example 1-3 | Example 1-4 | Example 1-5 | Example 1-6 | Example 1-7 | Example 1-8 | Example 1-9 | Example 1-10 | Example 1-11 | Example 1-12 |
|---|---|---|---|---|---|---|---|---|---|---|---|---|---|---|
| Blending | Polycarbonate resin (A) (parts by weight) | PC-A1 | 70 | 70 | 70 | 70 | 70 | 70 | 70 | 70 | 70 | 70 | 70 | 70 |
| | | PC-A2 | — | — | — | — | — | — | — | — | — | — | — | — |
| | | PC-A3 | — | — | — | — | — | — | — | — | — | — | — | — |
| | | PC-A4 | — | — | — | — | — | — | — | — | — | — | — | — |
| | Aromatic polycarbonate resin (B) (parts by weight) | PC-B1 | 30 | 30 | 30 | 30 | 30 | 30 | 30 | 30 | 30 | 30 | 30 | 30 |
| | | PC-B2 | — | — | — | — | — | — | — | — | — | — | — | — |
| | | PC-B3 | — | — | — | — | — | — | — | — | — | — | — | — |
| | Compound (C) | kind | sodium hydrogen carbonate (powder) | sodium hydrogen carbonate (powder) | sodium hydrogen carbonate (powder) | sodium hydrogen carbonate (powder) | sodium hydrogen carbonate (powder) | sodium hydrogen carbonate (powder) | sodium hydroxide (aqueous solution) | cesium carbonate (powder) | cesium carbonate (powder) | cesium carbonate (powder) | sodium chloride (powder) | potassium carbonate (powder) |
| | | amount added (ppm by weight) | 20 | 10 | 10 | 10 | 10 | 10 | 100 | 10 | 5 | 5 | 100 | 3 |
| | Acidic compound (E) | kind | — | — | phosphorous acid | phosphorous acid | phosphorous acid | phosphorous acid | — | — | — | phosphorous acid | — | — |
| | | amount added (mol) | — | — | 0.5 | 1 | 1.5 | 2 | — | — | — | 2 | — | — |
| | Metal amount (total) | ppm by weight | 20.5 | 10.5 | 10.5 | 10.5 | 10.5 | 10.5 | 100.7 | 10.5 | 5.5 | 5.5 | 100.4 | 3.5 |
| Properties | Melt viscosity @240° C., SR = 91.2 s$^{-1}$ | Pa · s | 920 | 1390 | 1520 | 1500 | 1470 | 1500 | 160 | 1000 | 1680 | 1600 | 680 | 1470 |
| | Ratio of viscosity to ideal viscosity (/2020 Pa · s) | % | 62 | 94 | 103 | 101 | 99 | 101 | 11 | 67 | 113 | 108 | 46 | 99 |

TABLE 1-continued

| | | Example No. | | | | | | | | | | | |
|---|---|---|---|---|---|---|---|---|---|---|---|---|---|
| | | Example 1-1 | Example 1-2 | Example 1-3 | Example 1-4 | Example 1-5 | Example 1-6 | Example 1-7 | Example 1-8 | Example 1-9 | Example 1-10 | Example 1-11 | Example 1-12 |
| Glass transition temperature (DSC method) | singularity °C. | A 125 | A 125 | A 125 | A 125 | A 125 | A 125 | A 125 | A 125 | A 125 | A 125 | A 125 | A 125 |
| Total light transmittance | % | 89.5 | 89.8 | 90.1 | 90.0 | 89.9 | 89.9 | 80.4 | 85.7 | 88.8 | 89.0 | 81.1 | 89 |
| Haze | % | 0.7 | 0.5 | 0.4 | 0.6 | 0.4 | 0.3 | 1.8 | 0.3 | 0.6 | 0.3 | 1.5 | 0.2 |
| Wet heat resistance (80° C. 95% RH_120 hr) | ΔHaze | 67.3 | 51.6 | 23.5 | 8.4 | 6.1 | 6.1 | 97.4 | — | — | — | 31 | — |
| Wet heat resistance (85° C. 85% RH_240 hr) | ΔHaze | — | — | — | — | — | — | — | 0.1 | 0.2 | 0.2 | — | 3.5 |
| Heat resistance (DTUL_1.80 MPa) | °C. | 105 | 107 | 107 | 106 | 106 | 105 | 104 | 108 | 107 | 107 | 105 | 106 |
| High-rate test (23° C.), ductile fracture rate | % | 80 | 100 | 100 | 100 | 100 | 100 | 0 | 100 | 100 | 100 | 100 | 100 |
| High-rate test (−20° C.), ductile fracture rate | % | 20 | 20 | 80 | 20 | 40 | 60 | 0 | 40 | 0 | 100 | 0 | 80 |
| Biogenic substance content rate (C$^{14}$ estimation) | % | 46.5 | 46.5 | 46.5 | 46.5 | 46.5 | 46.5 | 46.5 | 46.5 | 46.5 | 46.5 | 46.5 | 46.5 |

TABLE 2

| | | Example No. | | | | | | | | | | | |
|---|---|---|---|---|---|---|---|---|---|---|---|---|---|
| | | Example 1-13 | Example 1-14 | Example 1-15 | Example 1-16 | Example 1-17 | Example 1-18 | Example 1-19 | Example 1-20 | Example 1-21 | Example 1-22 | Example 1-23 | Example 1-24 |
| Blending | Polycarbonate resin (A) (parts by weight) | | | | | | | | | | | | |
| | PC-A1 | 70 | 90 | 50 | — | 70 | 70 | — | — | 70 | 70 | 70 | 70 |
| | PC-A2 | — | — | — | — | — | — | 70 | 70 | — | — | — | — |
| | PC-A3 | — | — | — | 70 | — | — | — | — | — | — | — | — |
| | PC-A4 | — | — | — | — | — | — | — | — | — | — | — | — |
| | Aromatic polycarbonate resin (B) (parts by weight) | | | | | | | | | | | | |
| | PC-B1 | 30 | 10 | 50 | 30 | — | — | 30 | 30 | 30 | 30 | 30 | 30 |
| | PC-B2 | — | — | — | — | 30 | — | — | — | — | — | — | — |
| | PC-B3 | — | — | — | — | — | 30 | — | — | — | — | — | — |
| | Compound (C) kind | potassium carbonate (powder) | potassium carbonate (powder) | potassium carbonate (powder) | potassium carbonate (powder) | potassium carbonate (powder) | potassium carbonate (powder) | potassium carbonate (powder) | calcium hydroxide (powder) | sodium chloride (powder) | lithium acetate | lithium stearate | sodium ortho-silicate |
| | amount added (ppm by weight) | 3 | 3 | 3 | 3 | 5 | 5 | 3 | 500 | 10 | 10 | 3 | 10 |
| | Acidic compound (E) kind | phosphorous acid | — | — | — | — | — | — | — | — | — | — | — |
| | amount added (mol) | 2 | — | — | — | — | — | — | — | — | — | — | — |
| Properties | Metal amount (total) ppm by weight | 3.5 | 3.3 | 3.4 | 3.4 | 5.8 | 5.3 | 3.5 | 500.5 | 10.4 | 10.4 | 10.4 | 10.4 |
| | Melt viscosity @240° C., SR = 91.2 s⁻¹ Pa·s | 1540 | 850 | 1300 | 1200 | 300 | 1220 | 780 | 1060 | 1100 | 820 | 860 | 680 |
| | Ratio of viscosity to ideal viscosity (/2020 Pa·s) % | 104 | 87 | 65 | 68 | 21 | — | 43 | 59 | 74 | 55 | 58 | 46 |

TABLE 2-continued

| | | Example 1-13 | Example 1-14 | Example 1-15 | Example 1-16 | Example 1-17 | Example 1-18 | Example 1-19 | Example 1-20 | Example 1-21 | Example 1-22 | Example 1-23 | Example 1-24 |
|---|---|---|---|---|---|---|---|---|---|---|---|---|---|
| Glass transition temperature (DSC method) | singularity °C. | A 125 | A 121 | A 130 | A 130 | A 120 | A 133 | A 111 | A 111 | A 125 | A 125 | A 125 | A 125 |
| Total light transmittance | % | 89.1 | 88 | 86.5 | 86.9 | 82.2 | 82.8 | 83.9 | 89.7 | 88.0 | 88.0 | 90.0 | 87.0 |
| Haze | % | 0.3 | 0.5 | 1.8 | 0.6 | 0.8 | 1 | 1.8 | 8 | 0.3 | 0.3 | 0.2 | 1.0 |
| Wet heat resistance (80° C. 95% RH_120 hr) | ΔHaze | — | — | — | — | — | — | — | — | — | — | — | — |
| Wet heat resistance (85° C. 85% RH_240 hr) | ΔHaze | 1.6 | 0 | 0 | 3.8 | 3.3 | 1.9 | 0.2 | 5.3 | 1.13 | 1.13 | 1.1 | 2.1 |
| Heat resistance (DTUL_1.80 MPa) | °C. | 106 | 100 | 110 | 111 | 98 | 110 | 92 | 92 | 107 | 107 | 107 | 107 |
| High-rate test (23° C.), ductile fracture rate | % | 100 | 100 | 100 | 100 | 80 | 60 | 100 | 100 | 100 | 100 | 100 | 100 |
| High-rate test (−20° C.), ductile fracture rate | % | 60 | 20 | 80 | 0 | 0 | 0 | 100 | 40 | 0 | 0 | 0 | 0 |
| Biogenic substance content rate ($C^{14}$ estimation) | % | 46.5 | 56 | 35.8 | 45.6 | 47.6 | — | 33.3 | 33.3 | 46.5 | 46.5 | 46.5 | 46.5 |

TABLE 3

| | | | Comparative Example No. | | | |
|---|---|---|---|---|---|---|
| | | | Comparative Example 1-1 | Comparative Example 1-2 | Comparative Example 1-3 | Comparative Example 1-4 |
| Blending | Polycarbonate resin (A) (parts by weight) | PC-A1 | 70 | — | 70 | 70 |
| | | PC-A2 | — | — | — | — |
| | | PC-A3 | — | 70 | — | — |
| | | PC-A4 | — | — | — | — |
| | Aromatic polycarbonate resin (B) | PC-B1 | 30 | 30 | 30 | 30 |
| | (parts by weight) | PC-B2 | — | — | — | — |
| | | PC-B3 | — | — | — | — |
| | Compound (C) | kind | — | — | TBT (liquid) | sodium hydrogen-carbonate (powder) |
| | | amount added (ppm by weight) | — | — | 1000 | 10 |
| | Acidic compound (E) | kind | — | — | — | — |
| | | amount added (mol) | — | — | — | — |
| | Metal amount (total) | ppm by weight | 0.4 | 0.4 | 0.4 | 10.4 |
| Properties | Melt viscosity @240° C. SR = 91.2 s$^{-1}$ | Pa · s | 1070 | 820 | 1100 | 1200 |
| | Ratio of viscosity to ideal viscosity (/2020 Pa · s) | % | 72 | 58 | 74 | 81 |
| | Glass transition temperature (DSC method) | singularity | C | A | C | C |
| | | ° C. | 122, 137 | 89 | 121, 136 | 122, 136 |
| | Total light transmittance | % | opaque | 89.74 | opaque | opaque |
| | Haze | % | — | 1.9 | — | — |
| | Wet heat resistance (80° C. 95% RH__120 hr) | ΔHaze | — | — | — | — |
| | Wet heat resistance (85° C. 85% RH__240 hr) | ΔHaze | — | 1.3 | — | — |
| | Heat resistance (DTUL__1.80 MPa) | ° C. | 107 | 75 | 108 | 108 |
| | High-rate test (23° C.), ductile fracture rate | % | 0 | 100 | 0 | 0 |
| | High-rate test (−20° C.), ductile fracture rate | % | 0 | 100 | 0 | 0 |
| | Biogenic substance content rate (C$^{14}$ estimation) | % | 46.5 | 18 | 46.5 | 46.5 |

As seen from Tables 1 to 3, the polycarbonate resin composition of Examples contains a polycarbonate resin (A) containing a constitutional unit derived from a compound represented by formula (1), an aromatic polycarbonate resin (B), and at least one compound (C) selected from the group consisting of compounds of Group I metals of the long-form periodic table and compounds of Group II metals of the long-form periodic table, in which the content of the compound (C) is from 0.5 to 1,000 ppm by weight in terms of metal amount in the compound (C). In such a polycarbonate resin composition, the total light transmittance as a molded body having a thickness of 2 mm was 80% or more, and the glass transition temperature measured by differential scanning calorimetric analysis was single. This polycarbonate resin composition had excellent transparency and at the same time, possessed high levels of biogenic substance content rate, heat resistance, wet heat resistance and impact resistance in a balanced manner.

Test Examples 2

Examples 2-1 to 2-7, Comparative Examples 2-1 to 2-4, and Reference Examples 2-1 and 2-2

Next, Examples, etc. of a polycarbonate resin composition containing a polycarbonate resin (A), a aromatic polycarbonate resin (B), a compound (C) and a crown ether compound (D) are described.

[Evaluation Method II]

In the following, the physical properties or characteristics of the polycarbonate resin (A), the aromatic polycarbonate resin (B) and the resin composition were evaluated by the following methods.

(II-1) Measurement of Reduced Viscosity

A sample of the polycarbonate resin (A) or the aromatic polycarbonate resin (B) was dissolved in methylene chloride to prepare a polycarbonate resin solution having a concentration of 0.6 g/dL. The transit time to of the solvent and the transit time t of the solution were measured using an Ubbelohde viscometer manufactured by Moritomo Rika Kogyo Co., Ltd. under the condition of a temperature of 20.0° C.±0.1° C., and the relative viscosity $\eta_{rel}$ was calculated according to the following formula (i). Subsequently, from the relative viscosity $\eta_{rel}$, the specific viscosity $\eta_{sp}$ was determined according to the following formula (ii):

$$\eta_{rel}=t/t_0 \quad (i)$$

$$\eta_{sp}=\eta_{rel}-1 \quad (ii)$$

The obtained specific viscosity $\eta_{sp}$ was divided by the concentration c (g/dL) of the solution to thereby determine the reduced viscosity ($\eta_{sp}$/c). A higher value of the reduced viscosity means a larger molecular weight.

(II-2) Measurement of Glass Transition Temperature (Tg)

Tg of the polycarbonate resin composition is a value of Tmg determined in conformity with the method of JIS-K7121 (1987) from a DSC curve obtained when using a differential scanning calorimeter, "DSC7", manufactured by Perkin Elmer, Inc. and subjecting the resin composition, in a nitrogen gas atmosphere, to temperature rise to 200° C. from 25° C. at a heating rate of 20° C./min, holding at 200° C. for 3 minutes, temperature drop to 25° C. at a cooling rate of 20° C./min, holding at 25° C. for 3 minutes, and again temperature rise to 200° C. at a heating rate of 5° C./min. Furthermore, the singularity in the glass transition temperature was evaluated. Specifically, the singularity was rated "A" when the DSC curve had a single peak, and the singularity was rated "C" when the DSC curve had a plurality of peaks.

(II-3) Measurement of Metal Amount in Polycarbonate Resin Composition

The metal amount in the polycarbonate resin composition was measured using ICP-MS (inductively coupled plasma mass spectrometer). Specifically, about 0.5 g of a sample of the polycarbonate resin composition was accurately weighed and subjected to closed pressure decomposition with sulfuric acid and nitric acid. For the closed pressure decomposition, a microwave decomposer, MULTIWAV, manufactured by PerkinElmer, Inc. was used. The solution resulting from decomposition was appropriately diluted with pure water and measured by ICP-MS (ELEMENT, manufactured by ThermoQuest). The alkali and alkaline earth metals determined were Li, Na, K, Cs, Mg, Ca, and Ba. Incidentally, the metal amount in Examples 2-1 to 2-7, Comparative Examples 2-1 to 2-4, and Reference Examples 2-1 and 2-2 includes not only metals derived from the compound (C) but also metals (e.g., Ca) derived from the polycarbonate resin (A) or metals (e.g., Cs) derived from the aromatic polycarbonate resin (B).

(II-4) Measurement of Total Light Transmittance

Pellets of the polycarbonate resin composition were dried at 90° C. for 4 hours or more by using a hot-air dryer. The dried pellets were then fed to an injection molding machine (Model J75EII, manufactured by The Japan Steel Works, Ltd.) and molded under the conditions of a resin temperature of 240° C., a mold temperature of 60° C. and a molding cycle of 50 seconds to obtain an injection-molded plate (100 mm (width)×100 mm (length)×2 mm (thickness)). The total light transmittance of the injection-molded plate was measured in conformity to JIS K7136 (2000) with a D65 light source by using a haze meter, "NDH2000", manufactured by Nippon Denshoku Industries Co., Ltd. Here, a total light transmittance of 80% or more was judged to have passed, and when the injection-molded plate was apparently opaque by visual observation, the evaluation result was shown as "opaque" instead of the measured value of the total light transmittance.

(II-5) Wet Heat Resistance Test

A constant-temperature and constant-humidity bath, "HIFLEX FX224P", manufactured by Kusumoto Chemicals, Ltd. was set to 85° C. and 85% RH, and a test piece of 100 mm or 50 mm (width)×100 mm (length)×2 mm (thickness) was left standing still in the bath for 480 hours to apply a wet heat treatment. Thereafter, the test piece was taken out and measured for the haze, and a difference (ΔHaze) from the haze before the wet heat resistance test was determined. Incidentally, the measurement of haze was performed in conformity to JIS-K7136 (2000) by using a haze meter, "NDH2000", manufactured by Nippon Denshoku Industries Co., Ltd. A larger value of ΔHaze means worse wet heat resistance, and a smaller value means better wet heat resistance. Here, when the injection-molded plate was opaque by visual observation in the measurement of the total light transmittance, implementation of this test (wet heat resistance test) was omitted.

(II-6) Heat Resistance Test

Pellets of the polycarbonate resin composition were dried at 90° C. for 4 hours or more by using a hot-air dryer. The dried pellets were then fed to an injection molding machine (Model J75EII, manufactured by The Japan Steel Works, Ltd.) and molded under the conditions of a resin temperature of 240° C., a mold temperature of 60° C. and a molding cycle of 50 seconds to obtain a multi-purpose test piece Type A described in JIS-K7139 (2009). A test piece having a length of 80 mm, a width of 10 mm and a thickness of 4 mm was cut out from the obtained multi-purpose test piece and measured for the deflection temperature under load by Method A (bending stress applied to test piece: 1.80 MPa) in conformity to JIS-K7191-2 (2007). In this test, although a deflection temperature under load of 90° C. or more was judged to have passed, the deflection temperature under load is preferably 95° C. or more, more preferably 100° C. or more.

(II-7) High-Rate Test

Pellets of the polycarbonate resin composition were dried at 90° C. for 4 hours or more by using a hot-air dryer. The dried pellets were then fed to an injection molding machine (Model J75EII, manufactured by The Japan Steel Works, Ltd.) and molded under the conditions of a resin temperature of 240° C., a mold temperature of 60° C. and a molding cycle of 50 seconds to obtain an injection-molded plate (100 mm (width)×100 mm (length)×2 mm (thickness)). A high-rate test of the obtained injection-molded plate was conducted using "Shimadzu Hydroshot Model HITS-P10" manufactured by Shimadzu Corp. under the conditions of a temperature of 23° C. or −20° C., a striker diameter of ⅝ inches, a support base diameter of 40 mm, and a test speed of 4.4 m/s. The ductile fracture rate was determined by dividing the scores of ductile-fractured samples out of samples evaluated on a 5-score scale by evaluation scores and multiplying the resulting value by 100.

(II-8) Bending Modulus

Pellets of the polycarbonate resin composition were dried at 90° C. for 4 hours or more by using a hot-air dryer. The dried pellets were then fed to an injection molding machine (Model J75EII, manufactured by The Japan Steel Works, Ltd.) and molded under the conditions of a resin temperature of 240° C., a mold temperature of 60° C. and a molding cycle of 50 seconds to obtain a multi-purpose test piece Type A described in JIS-K7139 (2009). A test piece having a length of 80 mm, a width of 10 mm and a thickness of 4 mm was cut out from the obtained multi-purpose test piece and measured for the bending modulus in conformity to JIS-K7171 (2008).

(II-9) Measurement of Biogenic Substance Content Rate

Radiocarbon 14 ($C^{14}$) is produced at a constant rate by a cosmic ray in the atmosphere and lost at a constant rate (half-life: 5,370 years) and therefore, is present in a constant amount in nature. Although plants taking up carbon dioxide in the atmosphere contains a constant amount of $C^{14}$, when carbon dioxide assimilation ceases due to milling, etc., the radiocarbon is lost at a constant rate, and radioactive dating is established by utilizing this property. Fossil fuel is not subject to the effect of a cosmic ray for a long time and is therefore deprived of all $C^{14}$. On the other hand, in the case of a bio-derived chemical, a long time has not passed since a stop of the supply of $C^{14}$, and it can be said that the $C^{14}$ content has almost a constant value.

The method for calculating the biogenic substance content by using the above-described method is specifically described. First, the ISB carbonate constitutional unit of ISB-PC consists of 6 carbons of bio-derived ISB and 1 DPC-derived carbon of fossil fuel and therefore, the biogenic substance content rate of ISB-PC is number of bio-derived carbons: 6/number of all carbons: 7=85.7%. Here, the effect of a terminal is neglected, because the polymer chain is sufficiently long. In the case of a copolymerized polycarbonate resin as in Production Example 1 described above, since CHDM is a fossil fuel-derived raw material, the biogenic substance content of CHDM-PC is number of bio-derived carbons: 0/number of all carbons: 9=0%. In the case of ISB/CHDM=70/30 mol % of Production Example 1-1, only the ISB-PC component is bio-derived and therefore, the biogenic substance content rate is 85.7%×70 mol %=60%.

Next, in the case of a blend of a polycarbonate resin (A) and an aromatic polycarbonate resin (B) as in Examples, since the aromatic polycarbonate resin (B) is a polymer produced from a fossil fuel-derived raw material, the biogenic substance content rate is 0%. In Examples where the resins are blended on a weight ratio basis, the molar mass (unit: g/mol) of each polycarbonate resin is calculated, the weight of each is divided by the molar mass, and the resulting value is converted to the molar fraction. Then, the biogenic substance content of the blend is calculated from the product of the biogenic substance content of the polycarbonate resin (A) and the molar fraction thereof. Incidentally, as to the calculation of the biogenic substance, the content is calculated only with resin components, and the components such as compound (D), heat stabilizer and release agent are not taken into account.

[Raw Materials Used]

The abbreviations and manufacturers of the compounds used in Examples and Comparative Examples below are as follows.

<Dihydroxy Compound>
  ISB: Isosorbide [produced by Roquette Froeres]
  CHDM: 1,4-Cyclohexanedimethanol [produced by SK Chemicals]
<Carbonic Acid Diester>
  DPC: Diphenyl carbonate [produced by Mitsubishi Chemical Corporation]
<Catalyst Deactivator (Acidic Compound (E)>
  Phosphorous acid [produced by Taihei Chemical Industrial Co., Ltd.] (molecular weight: 82.0)
<Heat Stabilizer (Antioxidant)>
  Irganox 1010: Pentaerythrityl-tetrakis[3-(3,5-di-tert-butyl-4-hydroxyphenyl)propionate] [produced by BASF]
  AS2112: Tris(2,4-di-tert-butylphenyl)phosphite [produced by ADEKA Corporation](molecular weight: 646.9)
<Release Agent>
  E-275: Ethylene glycol distearate [produced by NOF Corporation]

[Polycarbonate Resin (A)]

As the polycarbonate resin (A), PC-A1 manufactured in Production Example 1-1 or PC-A3 manufactured in Production Example 1-3 was used. Specifically, this is shown in Tables 4 and 5 later.

[Polycarbonate Resin (B)]

As the aromatic polycarbonate resin (B), PC-B1 was used. Specifically, this is shown in Tables 4 and 5 later.

[Compound (C)]

Sodium carbonate (produced by Wako Pure Chemical Industries, Ltd., special grade)
  Sodium hydrogencarbonate (produced by Wako Pure Chemical Industries, Ltd., special grade)
  Cesium carbonate (produced by Nacalai Tesque, Inc., special grade)

[Crown Ether Compound (D)]

18C6E (18-Crown-6-ether): 1,4,7,10,13,16-hexaoxacyclooctadecane (produced by Tokyo Chemical Industry Co., Ltd.)
  15C5E (15-Crown-5-ether): 1,4,7,10,13-pentaoxacyclopentadecane (produced by Tokyo Chemical Industry Co., Ltd.)

[Acidic Compound (E)]

Phosphorous acid (produced by Wako Pure Chemical Industries, Ltd., special grade)

Example 2-1

In this Example, PC-A1 was used as the polycarbonate resin (A), PC-B1 was used as the aromatic polycarbonate resin (B), 18-crown-6-ether was used as the crown ether compound (D), and potassium carbonate was used as the compound (C). More specifically, 70 parts by weight of the polycarbonate resin (A), 30 parts by weight of the aromatic polycarbonate resin (B), 1 times by mol of the crown ether compound (D) relative to the compound (C), and 2 ppm by weight, in terms of metal (K equivalent), of the compound (C) were blended and kneaded using a twin-screw kneader (TEX-30α, manufactured by The Japan Steel Works, Ltd. (L/D=52.5, L (mm): length of screw, D (mm): diameter of screw)) to perform a melt-reaction of the polycarbonate resin (A) and the aromatic polycarbonate resin (B). The ratio of the total length $L_t$ of the kneading zone to the diameter D (mm) of the kneader screw is 6 ($L_t$/D=6), and the kneading conditions are a flow rate: 10 kg/h, a rotational speed of screw: 200 rpm, and a cylinder temperature: 230° C. The extruder has two vacuum vent ports, and the kneading was performed under the condition of a vent vacuum degree of 11 kPa. The resin composition after the melt-reaction by kneading was extruded in the form of a strand and, through a water cooling step, cut into a pellet shape to obtain pellets of the polycarbonate resin composition.

Subsequently, the pellets obtained were dried by a hot-air dryer at temperature of 100° C. for 5 hours, and injection molding of the pellet was then performed using a 75-ton injection molding machine (EC-75, manufactured by Toshiba Machine Co., Ltd.). The molding conditions are a mold temperature: 60° C. and a cylinder temperature: 240° C. In this way, a test piece composed of a plate-like molded body of 100 mm (width)×100 mm (length)×2 mm (thickness)) was obtained. In addition, an ISO tensile test piece was obtained by performing the molding in the same manner. Using these test pieces, the above-described evaluations were performed, and the results obtained are shown in Table 4.

Example 2-2

Pellets of the polycarbonate resin composition, obtained in Example 2-1, were uniformly coated with a 15% by weight ethanol solution of phosphorous acid as the acidic compound (E). Here, the amount of the acidic compound (E) added was adjusted to become 2 times by mol relative to the amount of metal (K) in potassium carbonate added as the compound (C). Thereafter, ethanol was removed by air-drying. The thus-obtained pellets were melt-extruded in the same manner as in Example 2-1, thereby performing pelletization. Furthermore, drying, molding and evaluation of the polycarbonate resin composition were performed in the same manner as in Example 2-1. The results obtained are shown in Table 4.

Example 2-3

In this Example, pellets of the polycarbonate resin composition were manufactured in the same manner as in Example 2-1 except that 15-crown-5-ether was used as the crown ether compound (D), sodium hydrogencarbonate was used as the compound (C) and the amount of the compound (C) was changed to 3 ppm by weight in terms of metal (Na equivalent), and the pellets were uniformly coated with a 15% by weight ethanol solution of phosphorus acid as the acidic compound (E). Here, the amount of the acidic compound (E) added was adjusted to become 2 times by mol relative to the amount of metal (Na) in sodium hydrogencarbonate added as the compound (C). Thereafter, ethanol was removed by air-drying. The thus-obtained pellets were melt-extruded in the same manner as in Example 2-1, thereby performing pelletization. Furthermore, drying, molding and evaluation of the polycarbonate resin composition were performed in the same manner as in Example 2-1. The results obtained are shown in Table 4.

Example 2-4

In this Example, a polycarbonate resin composition was manufactured in the same manner as in Example 2-1 except that the amount of the crown ether compound (D) relative to the compound (C) was changed to 2 times by mol, cesium carbonate was used as the compound (C), and the amount of the compound (C) was changed to 7 ppm by weight in terms of metal (Cs equivalent), and a molded body (test piece) was manufactured using the resin composition and subjected to the same evaluations as in Example 2-1. The results obtained are shown in Table 4.

Example 2-5

Pellets of the polycarbonate resin composition, obtained in Example 2-4, were uniformly coated with a 15% by weight ethanol solution of phosphorus acid as the acidic compound (E). Here, the amount of the acidic compound (E) added was adjusted to become 2 times by mol relative to the amount of metal (Cs) in cesium carbonate added as the compound (C). Thereafter, ethanol was removed by air-drying. The thus-obtained pellets were melt-extruded in the same manner as in Example 2-1, thereby performing pelletization. Furthermore, drying, molding and evaluation of the polycarbonate resin composition were performed in the same manner as in Example 2-1. The results obtained are shown in Table 4.

Example 2-6

In this Example, a polycarbonate resin composition was manufactured in the same manner as in Example 2-1 except that the amount of the crown ether compound (D) relative to the compound (C) was changed to 0.1 times by mol, lithium carbonate was used as the compound (C), and the amount of the compound (C) was changed to 10 ppm by weight in terms of metal (Li equivalent), and a molded body (test piece) was manufactured using the resin composition and subjected to the same evaluations as in Example 2-1. The results obtained are shown in Table 4.

Example 2-7

In this Example, a polycarbonate resin composition was manufactured in the same manner as in Example 2-1 except that the amount of the crown ether compound (D) relative to the compound (C) was changed to 0.1 times by mol, lithium stearate was used as the compound (C), and the amount of the compound (C) was changed to 3 ppm by weight in terms of metal (Li equivalent), and a molded body (test piece) was manufactured using the resin composition and subjected to the same evaluations as in Example 2-1. The results obtained are shown in Table 4.

Comparative Example 2-1

In this Example, a polycarbonate resin composition was manufactured in the same manner as in Example 2-1 except that the compound (C) was not added, and a molded body (test piece) was manufactured using the resin composition and subjected to the same evaluations as in Example 2-1. The results obtained are shown in Table 5.

Comparative Example 2-2

In this Example, a polycarbonate resin composition was manufactured in the same manner as in Example 2-1 except that the compound (C) was not added, sodium hydrogencarbonate was used as the crown ether compound (D), and the amount of the crown ether compound (D) was changed to 5 ppm by weight in terms of metal (Na equivalent), and a molded body (test piece) was manufactured using the resin composition and subjected to the same evaluations as in Example 2-1. The results obtained are shown in Table 5.

Comparative Example 2-3

In this Example, a polycarbonate resin composition was manufactured in the same manner as in Example 2-1 except that the compound (C) and the crown ether compound (D) were not added, and a molded body (test piece) was manufactured using the resin composition and subjected to the same evaluations as in Example 2-1. The results obtained are shown in Table 5.

Comparative Example 2-4

In this Example, a polycarbonate resin composition was manufactured in the same manner as in Example 2-1 except that PC-A3 as the polycarbonate resin (A) was used in place of the aromatic polycarbonate resin (B) and the compound (C) and the crown ether compound (D) were not added, and a molded body (test piece) was manufactured using the resin composition and subjected to the same evaluations as in Example 2-1. The results obtained are shown in Table 5.

Reference Example 2-1

This Example was performed in the same manner as in Example 2-1 except that the compound (C) was not added and the amount of potassium carbonate used as the crown ether compound (D) was changed to 5 ppm by weight in terms of metal. The results obtained are shown in Table 5.

Reference Example 2-2

In this Example, a polycarbonate resin composition was manufactured in the same manner as in Example 2-1 except that the compound (C) was not added, sodium hydrogencarbonate was used as the crown ether compound (D), and the amount of the crown ether compound (D) was changed to 10 ppm by weight in terms of metal (Na equivalent), and a molded body (test piece) was manufactured using the resin composition and subjected to the same evaluations as in Example 2-1. The results obtained are shown in Table 5.

TABLE 4

| | | | Example 2-1 | Example 2-2 | Example 2-3 | Example 2-4 | Example 2-5 | Example 2-6 | Example 2-7 |
|---|---|---|---|---|---|---|---|---|---|
| Blending | Polycarbonate resin (A) PC-A1 | parts by weight | 70 | 70 | 70 | 70 | 70 | 70 | 70 |
| | PC-A3 | parts by weight | — | — | — | — | — | — | — |
| | Aromatic polycarbonate resin (B) | parts by weight | 30 | 30 | 30 | 30 | 30 | 30 | 30 |
| | Crown ether compound (D) kind | — | — | 18C6E | 18C6E | 15C5E | 18C6E | 18C6E | 18C6E | 18C6E |
| | amount added | times by mol | — | 1 | 1 | 1 | 2 | 2 | 0.1 | 0.1 |
| | Compound (C) kind | — | — | potassium carbonate | potassium carbonate | sodium hydrogen-carbonate | cesium carbonate | cesium carbonate | lithium acetate | lithium stearate |
| | amount added | ppm by weight | 2 | 2 | 3 | 7 | 7 | 10 | 3 |
| | Acidic compound (E) kind | — | — | — | phosphorous acid | phosphorous acid | — | phosphorous acid | — | — |
| | amount added | times by mol | — | 2 | 2 | — | 2 | — | — |
| | Metal amount (total) | ppm by weight | 2 | 2 | 3 | 7 | 7 | 10 | 3 |
| Properties | Glass transition temperature (DSC method) singularity | — | A | A | A | A | A | A | A |
| | Tg | °C. | 125 | 125 | 125 | 125 | 125 | 120 | 120 |
| | Total light transmittance | % | 88.9 | 88.7 | 89.8 | 87.6 | 87.7 | 87.4 | 87.8 |
| | Haze | % | 0.3 | 0.3 | 0.2 | 0.3 | 0.1 | 0.3 | 0.2 |
| | Wet heat resistance (85° C./85 RH %) ΔHaze@480 hr | % | 0.2 | 0.1 | 1.1 | 0.3 | 0.1 | 0.8 | 0.8 |
| | High-rate impact test condition of 23° C. | % | 100 | 100 | 100 | 100 | 100 | 100 | 100 |
| | condition of −20° C. | % | 80 | 100 | 60 | 80 | 80 | 0 | 0 |
| | Bending modulus | MPa | 2800 | 2800 | 2800 | 2750 | 2800 | 2800 | 2800 |
| | Heat resistance (DTUL@1.80 MPa) | °C. | 104 | 107 | 108 | 108 | 108 | 107 | 107 |
| | Biogenic substance content rate ($C^{14}$ estimation) | % | 46.5 | 46.5 | 46.5 | 46.5 | 46.5 | 46.5 | 46.5 |

TABLE 5

| | | | Comparative Example 2-1 | Comparative Example 2-2 | Comparative Example 2-3 | Comparative Example 2-4 | Reference Example 2-1 | Reference Example 2-2 |
|---|---|---|---|---|---|---|---|---|
| Blending | Polycarbonate resin (A) PC-A1 | parts by weight | 70 | 70 | 70 | 70 | 70 | 70 |
| | PC-A3 | parts by weight | — | — | — | 30 | — | — |
| | Aromatic polycarbonate resin (B) | parts by weight | 30 | 30 | 30 | — | 30 | 30 |
| | Crown ether compound (D) kind | — | — | — | — | — | — | — | — |
| | amount added | times by mol | — | — | — | — | — | — |
| | Compound (C) kind | — | potassium carbonate | sodium hydrogen-carbonate | — | — | potassium carbonate | sodium hydrogen-carbonate |
| | amount added | ppm by weight | 2 | 5 | — | — | 5 | 10 |
| | Acidic compound (E) kind | — | — | — | — | — | — | — |
| | amount added | times by mol | — | — | — | — | — | — |
| | Metal amount (total) | ppm by weight | 2 | 5 | 0.4 | 0.4 | 5 | 10 |
| Properties | Glass transition temperature (DSC method) singularity | — | C | C | C | A | A | A |
| | Tg | °C. | 122/136 | 121/136 | 122/137 | 89 | 125 | 124 |
| | Total light transmittance | % | opaque | opaque | opaque | 89.7 | 85.8 | 89.8 |
| | Haze | % | opaque | opaque | opaque | 1.9 | 1 | 0.5 |
| | Wet heat resistance (85° C./85 RH %) ΔHaze@480 hr | % | — | — | — | 1.7 | 1.4 | 93.2 |

TABLE 5-continued

|  |  |  | Comparative Example 2-1 | Comparative Example 2-2 | Comparative Example 2-3 | Comparative Example 2-4 | Reference Example 2-1 | Reference Example 2-2 |
|---|---|---|---|---|---|---|---|---|
| High-rate impact test | condition of 23° C. | % | 0 | 0 | 0 | 100 | 80 | 0 |
|  | condition of −20° C. | % | 0 | 0 | 0 | 100 | 0 | 0 |
| Bending modulus |  | MPa | 2750 | 2700 | 2750 | 2200 | 2800 | 2650 |
| Heat resistance (DTUL@1.80 MPa) |  | ° C. | 108 | 108 | 108 | 75 | 107 | 107 |
| Biogenic substance content rate ($C^{14}$ estimation) |  | % | 46.5 | 46.5 | 46.5 | 18 | 46.5 | 46.5 |

As seen from Tables 4 and 5, the polycarbonate resin composition of Examples contains a polycarbonate resin (A) containing a constitutional unit derived from a compound represented by formula (1), an aromatic polycarbonate resin (B), a crown ether compound (D), and at least one compound (C) selected from the group consisting of compounds of Group I metals of the long-form periodic table and compounds of Group II metals of the long-form periodic table, in which the content of the compound (C), per 100 parts by weight of the total amount of the polycarbonate resin (A) and the aromatic polycarbonate resin (B), is from 0.8 to 1,000 ppm by weight in terms of metal amount in the compound (C) and the content of the crown ether compound (D) relative to the compound (C) is from 0.1 to 10 times by mol. Such a polycarbonate resin composition had excellent transparency and at the same time, possessed high levels of biogenic substance content rate, heat resistance, wet heat resistance and impact resistance in a balanced manner.

While the invention has been described in detail and with reference to embodiments thereof, it will be apparent to one skilled in the art that various changes and modifications can be made therein without departing from the spirit and scope of the invention. This application is based on Japanese Patent Application (Patent Application No. 2015-131491) filed on Jun. 30, 2015 and Japanese Patent Application (Patent Application No. 2015-131492) filed on Jun. 30, 2015, the entirety of which is incorporated herein by way of reference. In addition, all the references cited herein are incorporated by reference in their entirety.

The invention claimed is:

1. A polycarbonate resin composition comprising:
a melt transesterification reaction product of
a polycarbonate resin (A) containing a constitutional unit derived from a compound represented by formula (1), and
an aromatic polycarbonate resin (B),
in the presence of at least one compound (C) selected from the group consisting of compounds of Group I metals of the long-form periodic table and compounds of Group II metals of the long-form periodic table,
wherein:
the melt transesterification reaction is conducted under reduced pressure,
the content of the compound (C) per 100 parts by weight of the total amount of the polycarbonate resin (A) and the aromatic polycarbonate resin (B) is from 0.8 to 1,000 ppm by weight in terms of the metal in the compound (C), and
the glass transition temperature as measured by differential scanning calorimetric analysis is single:

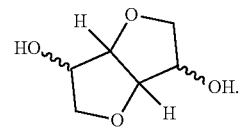

(1)

2. The polycarbonate resin composition according to claim 1, wherein a total light transmittance of a molded body of the polycarbonate resin having a thickness of 2 mm obtained by molding the polycarbonate resin composition is 80% or more.

3. The polycarbonate resin composition according to claim 1, wherein the compound (C) comprises a Group I metal of the long-form periodic table and a Group II metal of the long-form period table.

4. The polycarbonate resin composition according to claim 1, wherein the composition contains, as the compound (C), at least a compound of a Group I metal of the long-form periodic table and the content of the compound of a Group I metal of the long-form period table per 100 parts by weight of the total amount of the polycarbonate resin (A) and the aromatic polycarbonate resin (B) is from 0.8 to 1,000 ppm by weight in terms of the metal.

5. The polycarbonate resin composition according to claim 1, wherein the compound (C) is at least one member selected from the group consisting of an inorganic salt of a carbonate, a carboxylate, a phenolate, a halogen compound and a hydroxylated compound.

6. The polycarbonate resin composition according to claim 1, wherein the compound (C) is at least one member selected from the group consisting of a sodium compound, a potassium compound and a cesium compound.

7. The polycarbonate resin composition according to claim 1, further comprising an acidic compound (E).

8. The polycarbonate resin composition according to claim 7, wherein a content of the acidic compound (E) is from 0.1 to 5 times by mol relative to the content of the metal in the compound (C).

9. A molding body comprising the polycarbonate resin composition according to claim 1.

10. A polycarbonate resin composition comprising:
a melt transesterification reaction product of
a polycarbonate resin (A) containing a constitutional unit derived from a compound represented by formula (1), and
an aromatic polycarbonate resin (B),
in the presence of at least one compound (C) selected from the group consisting of compounds of Group I metals of the long-form periodic table and compounds of Group II metals of the long-form periodic table, and a crown ether compound (D), wherein:

the melt transesterification reaction is conducted under reduced pressure, the content of the compound (C) per 100 parts by weight of the total amount of the polycarbonate resin (A) and the aromatic polycarbonate resin (B) is from 0.8 to 1,000 ppm by weight in terms of the metal in the compound (C), and the content of the crown ether compound (D) is from 0.1 to 10 times by mol relative the amount in terms of the metal of the compound (C):

[Chem. 2]

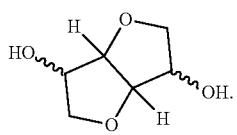

(1)

11. The polycarbonate resin composition according to claim 10, wherein a glass transition temperature of the polycarbonate resin as measured by differential scanning calorimetric analysis is single.

12. A method for producing a polycarbonate resin composition, comprising:

an addition step of adding at least one compound (C) selected from the group consisting of compounds of Group I metals of the long-form periodic table and compounds of Group II metals of the long-form periodic table in an amount of 0.5 to 1.000 ppm by weight in terms of the metal per 100 parts by weight of the total amount of a polycarbonate resin (A) containing a constitutional unit derived from a compound represented by the following formula (1) and an aromatic polycarbonate resin (B), and a reaction step of melt-reacting the polycarbonate resin (A) aromatic polycarbonate resin (B) after the addition step:

[Chem. 3]

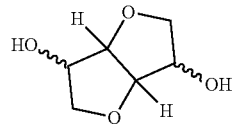

(1)

wherein the melt reaction is conducted under reduced pressure.

13. The method for producing a polycarbonate resin composition according to claim 12, wherein the melt reaction in the reaction step is carried out under the condition of a vacuum degree of 30 kPa or less.

14. The method for producing a polycarbonate resin composition according to claim 12, wherein the compound (C) is at least one member selected from the group consisting of an inorganic salt of a carbonate, a carboxylate, a phenolate, a halogen compound and a hydroxylated compound.

15. The method for producing a polycarbonate resin composition according to claim 12, wherein the compound (C) is at least one member selected from the group consisting of a sodium compound, a potassium compound and a cesium compound.

16. The method for producing a polycarbonate resin composition according to claim 12, wherein a crown ether compound (D) is further added in the addition step and the amount added of the crown ether compound (D) is from 0.1 to 10 times by mol relative to the amount in terms of the metal of the compound (C).

17. The method for producing a polycarbonate resin composition according to claim 12, wherein an acidic compound (E) is further added in the addition step.

18. The method for producing a polycarbonate resin composition according to claim 17, wherein an amount added of the acidic compound (E) is from 0.1 to 5 times by mol relative to the amount added of the metal in the compound (C).

* * * * *